(12) United States Patent
Buschur et al.

(10) Patent No.: US 10,082,070 B2
(45) Date of Patent: Sep. 25, 2018

(54) HIGH PERFORMANCE TURBO-HYDRAULIC COMPRESSOR

(71) Applicant: HYDRACHARGE LLC, Auburn Hills, MI (US)

(72) Inventors: Jeffrey J. Buschur, Lake Orion, MI (US); Richard S. Leemhuis, Rochester Hills, MI (US); Donald G. Shiloff, Indian River, MI (US)

( * ) Notice: Subject to any disclaimer, the term of this patent is extended or adjusted under 35 U.S.C. 154(b) by 170 days.

(21) Appl. No.: 14/798,958

(22) Filed: Jul. 14, 2015

(65) Prior Publication Data

US 2016/0024997 A1    Jan. 28, 2016

Related U.S. Application Data

(63) Continuation-in-part of application No. 13/511,085, filed on Dec. 8, 2010, now Pat. No. 9,080,503.

(51) Int. Cl.
| | | |
|---|---|---|
| *F02B 37/10* | (2006.01) | |
| *F02B 33/40* | (2006.01) | |
| *F02D 41/00* | (2006.01) | |
| *F02B 39/08* | (2006.01) | |
| *F02B 39/12* | (2006.01) | |

(52) U.S. Cl.
CPC ............. *F02B 37/10* (2013.01); *F02B 33/40* (2013.01); *F02B 39/08* (2013.01); *F02B 39/12* (2013.01); *F02D 41/0007* (2013.01); *Y02T 10/144* (2013.01)

(58) Field of Classification Search
CPC .......... F02B 37/10; F02B 39/08; F02B 39/12; F02B 33/40; F02D 41/007; Y02T 10/144

USPC .......................................................... 60/607
See application file for complete search history.

(56) References Cited

U.S. PATENT DOCUMENTS

| | | | | |
|---|---|---|---|---|
| 2,068,914 A | | 1/1937 | Handley | |
| 2,098,398 A | * | 11/1937 | Mercier | .................. B64C 25/60 |
| | | | | 188/317 |
| 2,968,914 A | * | 1/1961 | Birmann | .................. F02B 37/10 |
| | | | | 60/39.181 |

(Continued)

FOREIGN PATENT DOCUMENTS

| | | | |
|---|---|---|---|
| WO | | 2009136994 A1 | 11/2009 |
| WO | WO 2009/136994 A1 | | 11/2009 |

*Primary Examiner* — Jason Newton
(74) *Attorney, Agent, or Firm* — J. Gordon Lewis

(57) ABSTRACT

Use of the hydraulically driven device in a series configuration with a minimally restrictive turbocharger is defined which will allow a very responsive and powerful boosting system to reach boost levels of 4-5 pressure ratio (PR) to support and enable OEM engine downsizing trends. An electric supercharger is also considered. A hydraulic drive assists to increase the acceleration rate of a turbocharger impeller/turbine shaft assembly and provide a secondary means of driving the compressor impeller at lower engine speeds where exhaust gases alone does not generate adequate shaft speeds to create significant induction boost. The hydraulic circuit includes a dual displacement motor, which provides high torque for acceleration yet converts to a single motor for high-speed operation. When the exhaust driven turbine function allows compressor speeds, beyond which the hydraulic system can contribute, a slip clutch allows disengagement of the hydraulic drive. In an alternative embodiment, the hydraulic drive provides means of forced induction air alone.

6 Claims, 28 Drawing Sheets

(56) References Cited

U.S. PATENT DOCUMENTS

| | | | |
|---|---|---|---|
| 3,389,554 A | 6/1968 | Wolf | |
| 3,473,322 A * | 10/1969 | Gottlieb | F02B 37/10 60/607 |
| 3,495,418 A | 2/1970 | Kapich | |
| 3,869,866 A | 3/1975 | Timoney | |
| 3,927,530 A | 12/1975 | Braun | |
| 4,083,188 A | 4/1978 | Kumm | |
| 4,188,918 A | 2/1980 | Robbins, Jr. | |
| 4,285,200 A | 8/1981 | Byrne et al. | |
| 4,309,972 A | 1/1982 | Vallance et al. | |
| 4,322,949 A | 4/1982 | Byrne et al. | |
| 4,444,014 A | 4/1984 | Kobayashi et al. | |
| 4,478,043 A | 10/1984 | Kobayashi et al. | |
| 4,622,817 A | 11/1986 | Kobayashi | |
| 4,729,225 A | 3/1988 | Bucher | |
| 4,803,969 A * | 2/1989 | Hiereth | F02B 37/10 123/561 |
| 4,969,332 A | 11/1990 | Nancarrow et al. | |
| 4,996,844 A | 3/1991 | Nancarrow | |
| 5,003,772 A | 4/1991 | Huber | |
| 5,076,060 A | 12/1991 | Adeff | |
| 5,113,658 A | 5/1992 | Kobayashi | |
| 5,346,364 A | 9/1994 | Kapich | |
| 5,375,419 A | 12/1994 | Wright et al. | |
| 5,421,310 A | 6/1995 | Kapich | |
| 5,471,965 A | 12/1995 | Kapich | |
| 5,492,103 A * | 2/1996 | Goto | F02B 29/0418 123/563 |
| 5,535,845 A | 7/1996 | Buschur | |
| 5,561,978 A | 10/1996 | Buschur | |
| 5,669,461 A | 9/1997 | Buschur | |
| 5,687,568 A | 11/1997 | Buschur | |
| 5,724,949 A | 3/1998 | Liang | |
| 5,778,693 A | 7/1998 | Mientus | |
| 5,881,630 A | 3/1999 | Buschur et al. | |
| 5,904,045 A | 5/1999 | Kapich | |
| 5,924,286 A | 7/1999 | Kapich | |
| 5,937,832 A | 8/1999 | Kapich | |
| 5,937,833 A | 8/1999 | Kapich | |
| 5,946,911 A | 9/1999 | Buschur et al. | |
| 5,960,628 A | 10/1999 | MacHesney | |
| 5,960,748 A | 10/1999 | Lewis | |
| 5,996,701 A | 12/1999 | Fukasawa et al. | |
| 5,997,426 A * | 12/1999 | Ito | F16H 47/04 475/72 |
| 6,016,657 A | 1/2000 | Buschur | |
| 6,021,641 A | 2/2000 | Buschur et al. | |
| 6,041,602 A | 3/2000 | Dickey | |
| 6,092,371 A | 7/2000 | Feucht et al. | |
| 6,139,740 A | 10/2000 | Oklejas | |
| 6,158,216 A | 12/2000 | Buschur et al. | |
| 6,273,076 B1 * | 8/2001 | Beck | F02B 29/0418 123/562 |
| 6,308,665 B1 | 10/2001 | Lewis | |
| 6,412,278 B1 | 7/2002 | Matthews | |
| 6,502,398 B2 * | 1/2003 | Kapich | F01D 1/14 123/565 |
| 6,612,822 B2 | 9/2003 | Buschur et al. | |
| 6,629,411 B2 | 10/2003 | Buschur et al. | |
| 6,715,289 B2 | 4/2004 | Mader et al. | |
| 7,111,704 B2 | 9/2006 | Johnson | |
| 7,481,056 B2 | 1/2009 | Blaylock et al. | |
| 7,490,594 B2 | 2/2009 | Van Dyne et al. | |
| 7,608,011 B2 | 10/2009 | Grabowski et al. | |
| 8,794,000 B2 * | 8/2014 | Baldwin | F02B 33/40 123/562 |
| 2003/0188535 A1 | 10/2003 | Mader | |
| 2006/0032225 A1 | 2/2006 | Van Dyne et al. | |
| 2010/0263375 A1 * | 10/2010 | Grieve | F02B 29/0412 60/612 |

\* cited by examiner

PERCENT FULL BATTERY VOLTAGE APPLIED TO SOLENOID VALVE

| TPX | ENGINE SPEED | 5 | 10 | 15 | 20 | 25 | 30 | 35 | 40 | 45 | 50 | 55 | 60 | 65 | 70 | 75 | 80 | 85 | 90 | 95 | 100 | 105 | 110 | 115 |
|---|---|---|---|---|---|---|---|---|---|---|---|---|---|---|---|---|---|---|---|---|---|---|---|---|
| 17 | 0 | 11 | 15 | 19 | 22 | 26 | 29 | 33 | 37 | 40 | 44 | 47 | 51 | 55 | 58 | 62 | 66 | 69 | 73 | 76 | 80 | 84 | 87 | 91 |
| 21 | 500 | 0 | 12 | 16 | 19 | 23 | 27 | 31 | 35 | 38 | 42 | 46 | 50 | 54 | 57 | 61 | 65 | 69 | 72 | 76 | 80 | 84 | 88 | 91 |
| 24 | 1000 | 0 | 0 | 13 | 16 | 20 | 24 | 28 | 32 | 36 | 40 | 44 | 48 | 52 | 56 | 60 | 64 | 68 | 72 | 76 | 80 | 84 | 88 | 92 |
| 28 | 1500 | 0 | 0 | 0 | 9 | 13 | 17 | 22 | 26 | 30 | 34 | 38 | 42 | 47 | 51 | 55 | 59 | 63 | 67 | 72 | 76 | 84 | 88 | 93 |
| 32 | 2000 | 0 | 0 | 0 | 0 | 10 | 14 | 18 | 23 | 27 | 32 | 36 | 40 | 45 | 49 | 54 | 58 | 62 | 67 | 71 | 76 | 80 | 84 | 89 | 93 |
| 36 | 2500 | 0 | 0 | 0 | 0 | 0 | 10 | 15 | 19 | 24 | 29 | 33 | 38 | 43 | 47 | 52 | 57 | 61 | 66 | 71 | 75 | 80 | 85 | 89 | 94 |
| 39 | 3000 | 0 | 0 | 0 | 0 | 0 | 0 | 11 | 16 | 21 | 26 | 31 | 36 | 40 | 45 | 50 | 55 | 60 | 65 | 70 | 75 | 80 | 85 | 90 | 95 |
| 43 | 3500 | 0 | 0 | 0 | 0 | 0 | 0 | 0 | 12 | 17 | 22 | 27 | 33 | 38 | 43 | 48 | 54 | 59 | 64 | 69 | 75 | 80 | 85 | 91 | 96 |
| 47 | 4000 | 0 | 0 | 0 | 0 | 0 | 0 | 0 | 0 | 12 | 18 | 24 | 29 | 35 | 41 | 46 | 52 | 57 | 63 | 69 | 74 | 80 | 86 | 91 | 97 |
| 50 | 4500 | 0 | 0 | 0 | 0 | 0 | 0 | 0 | 0 | 0 | 13 | 19 | 26 | 32 | 38 | 44 | 50 | 56 | 62 | 68 | 74 | 80 | 86 | 92 | 98 |
| 54 | 5000 | 0 | 0 | 0 | 0 | 0 | 0 | 0 | 0 | 0 | 0 | 15 | 21 | 28 | 34 | 41 | 47 | 54 | 60 | 67 | 73 | 80 | 87 | 93 | 100 |
| 58 | 5500 | 0 | 0 | 0 | 0 | 0 | 0 | 0 | 0 | 0 | 0 | 0 | 16 | 23 | 30 | 37 | 44 | 52 | 59 | 66 | 73 | 80 | 87 | 94 | 101 |
| 62 | 6000 | 0 | 0 | 0 | 0 | 0 | 0 | 0 | 0 | 0 | 0 | 0 | 0 | 18 | 25 | 33 | 41 | 49 | 57 | 64 | 72 | 80 | 88 | 96 | 103 |
| 65 | 6500 | 0 | 0 | 0 | 0 | 0 | 0 | 0 | 0 | 0 | 0 | 0 | 0 | 0 | 20 | 28 | 37 | 45 | 54 | 63 | 71 | 80 | 89 | 97 | 106 |
| 69 | 7000 | 0 | 0 | 0 | 0 | 0 | 0 | 0 | 0 | 0 | 0 | 0 | 0 | 12 | 22 | 32 | 41 | 51 | 61 | 70 | 80 | 90 | 99 | 109 |

TPX = (TP2−TP1)/7000*N + TP1
DUTY CYCLE = (DC2−DC1)/(100−TPX)*(TP−100) + DC2

CONSTANTS IN ALGORITHM

| TP1 | 17 |
|---|---|
| TP2 | 69 |
| DC1 | 20 |
| DC2 | 80 |

| MIN. PWM | 9 |
|---|---|

FIG. 14

HIGH PERFORMANCE TURBO-HYDRAULIC COMPRESSOR

RELATED PATENT APPLICATION

This application is a continuation-in-part and claims priority to U.S. patent application Ser. No. 13/511,085 filed 21 May 2012, entitled "Hydraulic Turbo Accelerator Apparatus".

TECHNICAL FIELD

Historically automotive engines, particularly diesels, have been equipped with a method of boosting the inlet air density in order achieve greater power per unit engine displacement. The large majority of the diesel systems are turbocharged. Turbochargers have an efficiency advantage over crank driven superchargers in that the power to drive the air compressor is partially obtained from the cooling of the exhaust gas stream and the remainder from the backpressure placed upon the exhaust enabling the turbine power conversion, which is preferably to pure accessory belt loading, however they struggle with response issues, which limit vehicle acceleration capabilities.

Turbochargers also have some limitations as to the boost levels available at lower engine speeds due to limited exhaust gas velocity and efficient system design. Turbocharger technology is being enhanced to overcome these obstacles by means such as smaller "starter/low end turbos" and variable vane/variable nozzle geometries.

Legislative pressure caused by environmental concerns have driven significant change in automotive engine and powertrain technology over the last several decades Imperatives such as 95 gms/km CO2 emissions and 54.5 CAFÉ by 2025 loom as huge challenges at this time. Engine downsizing and down-speeding trends will continue towards sub one liter displacements and three or even less cylinders. Smaller slower turning engines are more efficient than their larger historical 8, 6 and 4 cylinder predecessors as frictional and pumping losses are substantially reduced with mass reduced as well further enhancing overall vehicle efficiency. Vehicle performance has been maintained and/or improved despite this massive reduction in engine displacement by use of forced air induction systems. Turbochargers, which had been primarily developed and cost-reduced for the diesel markets, are the predominant forced air induction technology being employed by the OEM's.

Enabling technologies such as variable valve timing and gasoline direct injection among others are allowing boost levels perceived well beyond the feasibility of pump gasoline a generation ago. Brake Mean Effective Pressures (BMEP) have now through downsizing been practically raised to 20 bar or more and are projected to approach 35-40 bar in the coming years as average engine displacement continues its downward trend.

Exhaust Gas Recirculation (EGR) is being employed in ever larger percentages to provide an inert gas to buffer the burn process allowing cooler combustion temperatures resulting in a reduction of NOx. The recirculating gas also allows a reduction in the pumping losses the engine incurs with throttle positioned incrementally below Wide Open Throttle (WOT) as less of a vacuum results in the intake manifold. The use of EGR as an emissions reduction strategy unfortunately works counter to the trend of increasing BMEP as there is less oxygen available per unit engine displacement during combustion.

The concurrence of the desire to achieve ever higher BMEP and use of EGR require very aggressive engine intake boost levels. Pressure Ratios (PR) of 4-5 are being projected compared to upper ends of PR being in the 2-3 range today. Ideally OEM's are looking for a forced air induction system which can effectively reach boost levels of 50 psi (PR 4.5) across the full range of engine speeds instantaneously upon driver demand. There is no such boosting system available to the OEM's today.

Centrifugal compressors are well known in the industry as a means of compressing air for forced induction of air into an internal combustion engine. Their simplicity of construction and high efficiencies make them desire-able as air pumps for these applications. Generally they are powered by an exhaust gas turbine in a configuration very commonly known as turbochargers. Slow acceleration of these turbines known as "turbo lag" has always been an issue as turbine devices although capable of large power output at very high speed are low torque output devices on relative scale to positive displacement devices such as a reciprocating piston motor.

Centrifugal compressors are also employed on some low volume OEM applications and aftermarket applications in a belt driven configuration. They create a very potent configuration in upper engine speed ranges but the inertia of the high speed impellers as reflected through their step up gearboxes to the drive pulley create exceedingly high loads on the belt upon rapid engine speed changes. They are also at the disadvantage that the pressure or boost created by the spinning impeller is a function of speed squared. Thus it is a compromise as to the pulley ratio at which meaningful boost is created in the lower engine speed ranges with-out consuming huge amounts of power at high engine speeds.

There has recently been activity in development of electrically driven superchargers to be used in conjunction with turbochargers to provide boost as the turbocharger rotating group spools up. They are becoming known as "torque fillers". The large amount of power required to compress air makes these devices marginally beneficial on a 12V vehicle electrical system because of overall system capacity and the large current draw which would be some several hundred amperes. In order to compensate for this the electrical superchargers are being coupled with 48V vehicle electrical systems and regenerative braking systems. Even at the higher voltage the system cannot continuously provide the required compressor power levels so banks of super-capacitors are employed allowing an immediate burst of energy. Therefore aside from the expense of the 48V electrical system the electrical superchargers are still only an intermittent solution.

Many automotive engines, particularly diesels, are equipped with a method of boosting the inlet air density in order achieve greater power per unit engine displacement. The large majority of these systems are turbocharged diesels with a smaller market share consisting of supercharged gasoline power trains. Turbochargers have an efficiency advantage in that the power to drive the air compressor is obtained from exhaust energy, which is preferable to accessory belt loading, however they struggle with response issues, which limit vehicle acceleration capabilities. Further, the increased exhaust pressures and temperatures incurred with turbocharger applications lead to heavier exhaust systems which, along with the thermal mass of the turbocharger itself, tend to create emissions issues as the "light-off" of the catalytic converter is delayed.

Turbochargers also have some limitations as to the boost levels available at lower engine speeds due to limited exhaust gas velocity and efficient system design. Turbocharger technology is being enhanced to overcome these obstacles by means such as "starter/low end turbos" and variable vane/variable nozzle geometries. These smaller improvements however lead to additional restriction and thermal mass which exacerbate the aforementioned emissions issues.

Recently, with the renewed emphasis on energy conservation, there is much focus on using turbochargers to allow smaller engines in like sized vehicles thus increasing fuel efficiency. These downsizing efforts are primarily directed to gasoline engines where larger operating speed ranges make these issues more pronounced than in diesel engines.

BACKGROUND OF THE INVENTION

Centrifugal compressors are well known in the industry as a source of compressed air for forced induction of air into an internal combustion engine. Their simplicity of construction and high efficiencies make them desirable as air pumps for these applications. Generally, they are powered by an exhaust gas turbine in a configuration very commonly known as turbochargers. Slow acceleration of these turbines known as "turbo lag" has always been an issue as turbine devices, although capable of large power output at very high speed, are low torque output devices on relative scale to positive as "turbo lag" has always been an issue as turbine devices although capable of large power output at very high speed are low torque output devices on relative scale to positive displacement devices such as gear, gerotor, vane or piston hydraulic motors.

Several patents relate to turbine type hydraulic devices to accelerate the turbo rotating assembly. Examples are:

U.S. Pat. No. 5,113,658 to R. Kobayashi describes a hydraulic assist turbocharger system operative to supply charge air to a combustion engine. The system includes at least one turbocharger having a hydraulic assist turbine adapted to be driven by a pressurized hydraulic fluid to supplementally drive the turbocharger during selected engine operating conditions when supplemental charge air is required. Hydraulic fluid flow is regulated by an electrohydraulic control valve responsive to control signals from a main controller, wherein the control signals and corresponding control valve operation may be independent of engine speed and load. In addition, the hydraulic fluid is supplied to the hydraulic assist turbine via a dual segment nozzle, with selector valves coupling the fluid for passage through one or both nozzle segments in accordance with engine charge air requirements.

U.S. Pat. No. 4,083,188 to E. Kumm describes a system for supercharging a low compression Diesel engine. The system includes connected turbine and compressor elements and a hydraulic system having a first motor/pump unit mechanically connected with the turbine and compressor elements and a second motor/pump unit mechanically connected, through an output transmission, to an engine. The hydraulic system also includes a plurality of valves, an accumulator, a reservoir, and ducts connecting such elements and the motor/pump units. The first motor/pump unit is of the variable volume type and is controlled by an actuator responsive to fluid pressures in the inlet and exhaust manifolds of the engine. The second motor/pump unit is a fixed displacement device which may be driven by fluid pressure from the accumulator in the engine starting phase and by the engine to supply hydraulic pressure to recharge the accumulator and assist in controlling the operation of the supercharger. The operation of the supercharger is also controlled in part by a valve mechanism responsive to fluid pressures generated by the motor/pump units during predetermined phases of engine operation.

U.S. Pat. No. 3,389,554 to G. Wolf describes a supercharged internal combustion piston engine having at least one exhaust-driven turbo compressor for supplying combustion air to the engine. The turbo compressor is provided with an auxiliary drive for supplying additional power thereto, the auxiliary drive comprising a hydraulic volumetric motor unit coupled directly to the turbo compressor, and a power driven pump unit connected by appropriate hydraulic conduits to the hydraulic motor unit and to a reservoir for hydraulic fluid. The hydraulic conduit leading to the hydraulic motor unit is connected to a source of air by means of an air conduit. The air conduit is provided with a normally closed pressure actuated valve whish is adapted to open when the pressure on the pressure-responsive actuating mechanism of the valve reaches a predetermined value. When the pressure actuated valve is thus opened, air or a mixture of air and hydraulic fluid flows through the motor unit.

U.S. Pat. No. 3,869,866 to S. Timoney describes drives and controls for an exhaust gas turbocharger for an internal combustion engine in which the turbocharger is primarily driven by exhaust gases from the engine and includes an auxiliary hydraulic turbine which also has a driving connection to the turbocharger and which receives pressurized fluid from a fixed displacement pump to drive the turbine during certain operating conditions of the engine. The pump is connected to a rotary output shaft of the engine by means of a clutch member which selectively connects and disconnects the pump in response to a preselected operating characteristic of the engine. Such operating characteristic is selected from the group consisting of at least one of the engine speed, oil pressure, air manifold pressure, and fueling rate characteristics of the engine. In one embodiment, the clutch is disconnected after the engine reaches a predetermined operating speed, as measured by a sensing unit or tachometer responsive directly to engine shaft speed, by sensing the pressure at which the fluid is discharged from the pump and which corresponds to the preselected engine speed. In another embodiment, the clutch control is also responsive to one of the operating characteristics of the engine for automatically disengaging the clutch in response to load conditions below a selected predetermined minimum, for example when the engine fuel depend rate is below 80 percent of the demand rate for maximum torque at a particular speed.

U.S. Pat. No. 3,927,530 to A. Braun describes a supercharged internal combustion engine having an exhaust-driven turbocharger for supplying combustion air to the engine and auxiliary power means for additionally applying a driving force to the compressor under occasional and otherwise normally deficient combustion air conditions, to provide the desired amount of combustion air for proper combustion. The power means includes a hydraulic assist motor mechanically coupled with the turbocharger and a hydraulic pump connected by a fluid flow passageway with the motor and permanently coupled with a drive shaft of the engine. The pump is connected through a selector valve to the oil in the reservoir of the engine's crankcase or to the vapor chamber above the oil level in the reservoir or to the atmosphere. The selector valve may be manually controlled or automatically controlled by a sensor responsive to one or more of such engine conditions as manifold air pressure, engine speed, etc. The valve may also have a bleed passageway therein that connects with the oil reservoir when the pump is pumping vapor or air to assure adequate lubrication of the pump and, if need be, the hydraulic motor.

U.S. Pat. No. 7,490,594 B2 to E. Dyne et al. describes a device combining the features of a supercharger, a turbocharger and turbo-compounding into one system, utilizing a hydraulic or mechanical continuously variable transmission to drive the turbocharger up to a specific speed or intake manifold pressure and then holding the ideal speed to keep it at the right boost pressure for the engine condition. The benefits of a supercharger, which is primarily good for high torque at low speed, and a turbocharger, which is usually only good for high horsepower at high speeds are merged. Once the exhaust energy begins to provide more work than it takes to drive the intake compressor, the device recovers that excess energy and uses it to add torque to the crankshaft. As a result, the device provides the benefits of low speed with high torque and the added value of high speed with higher horsepower or better fuel economy from a single system.

These forgoing known hydraulic turbines create more torque than an equivalent gas driven turbine as the density of the oil is roughly 1000 times greater than air, but still are relatively poor at creating angular acceleration. Positive displacement hydraulic devices create torque in proportion to applied pressure essentially independent of rotational speed or time variants.

Centrifugal compressors are also employed on some low volume OEM applications and aftermarket applications in a belt driven configuration. They create a very potent configuration in upper engine speed ranges but the inertia of the high speed impellers as reflected through their step up gearboxes to the drive pulley create exceedingly high loads on the belt upon rapid engine speed changes. They are also at the disadvantage that the pressure or boost created by the spinning impeller is a function of speed squared. Thus, it is a compromise as to the pulley ratio at which meaningful boost is created in the lower engine speed ranges without consuming huge amounts of power at high engine speeds.

U.S. Pat. No. 7,490,594 B2 teaches an elaborate mechanism in which a hydraulic motor is implemented either to provide or absorb power from a turbocharger shaft. The fixed displacement hydraulic motor is coupled to a variable pump/motor of piston and swash plate design which in turn is coupled to the engine such that energy can be effectively transferred in either direction. Given that the mechanism permanently couples the turbocharger shaft to the hydraulic drive, it would represent a large power loss in the operational region after the turbocharger is accelerated but before there is adequate power available to effectively transfer back to the engine. Further piston swash plate hydraulic devices are expensive devices and would limit the market appeal of such a system.

Unrelated to the field of force air induction for an internal combustion engine, U.S. Pat. No. 5,561,978 to Buschur and associated patents teach the use of two fixed displacement motors driving a common output shaft such that a pseudo variable displacement motor is produced.

U.S. Pat. No. 5,076,060 to Adeff teaches a control mechanism for a hydraulic assisted turbo which allows the driver to select a sport mode in which the hydraulics are activated. Upon subsequent mild use of the accelerator the hydraulics are de-activated after a period of time to reduce power consumption.

U.S. Pat. No. 4,729,225 to Bucher teaches a turbocharger energy recovery system in which a variable motor/pump coupled to the turbocharger shaft is utilized to either accelerate the turbocharger shaft through means of hydraulic flow generated by a pump powered in turn by an electric motor. Or, recover energy from the turbocharger shaft and turn a fixed displacement motor to drive auxiliary loads.

U.S. Pat. No. 4,083,188 to Kumm teaches a turbocharger coupled to a hydraulic motor/pump in fluid communication with a pump geared to the engine to maintain desired pressure differentials between engine intake and exhaust manifolds. An accumulator is employed to allow pressurized fluid to turn the pump coupled to the engine thus defining an alternate engine starting device.

The above-referenced patents typify the state of the art. Presently, vehicle manufacturers are downsizing internal combustion engines (Otto and Diesel cycle types) to meet fuel economy and emissions regulations. Forced air induction, typically accomplished through turbocharging, is becoming prevalent through-out the ground transportation (passenger vehicles and trucks) industry to maintain or even improve current levels of overall vehicle performance. Costs driven by emissions issues and lag reduction strategies place such turbo systems out of economic reach of low end standard equipment vehicles.

Commercial hydraulic hardware is typically too expensive and heavy for automotive use. Turbo systems often intrude on power-train emissions. The higher thermal mass and restriction of turbo equipped exhaust systems drive expensive add-ons to avoid retarding the light off of the catalytic converter. Solutions to reduce "turbo lag" such as sequential and variable designs raise costs and complexity while exacerbating these emissions issues. Superchargers provide the "off the line" torque drivers desire. Traditional belt driven superchargers provide the best "replacement for displacement", but are expensive, cumbersome to implement and take power pumping air even when not needed.

The basic hydraulic circuit and drive mechanism as defined in the above identified priority application are still applicable.

It is, therefore, a primary object of the present invention to re-deploy existing automotive radiator fan drive technology to provide a cost effective and easily implemented forced air induction solution suitable for low end standard equipment vehicles which simultaneously improves fuel economy and vehicle performance. The present invention provides components designed to be competitive in the "no frills" automotive radiator fan marketplace.

SUMMARY OF THE INVENTION

It is an object of this invention to provide means to define key success factors of an automotive hydraulically driven supercharger system.

It is a further object of this invention to define configurations of packaging of key components to enhance the viability of the technology.

It is yet another object of this invention to define means in which a centrifugal compressor can be powered by hydraulic means alone in a manner, which can be responsive and efficient across all operating speed, ranges. This includes several ways to produce multiple drive ratios from combinations of fixed displacement motors and pumps.

It is yet still a further object to define a means by which these objectives can be met by a hydraulic system which is integrated to the power steering assist circuit to reduced hardware and increase overall system efficiency.

Further yet it is another object of this invention to define a means in which such a defined hydraulically driven supercharger system can be configured in conjunction with a standard turbocharger to constitute a highly capable overall vehicle boosting system. This system could be very responsive and fuel efficient and could provide the high PR the OEM industry will be seeking in coming years.

Further yet it is another object of this invention to define a means in which such a defined hydraulically driven supercharger system can be configured in conjunction with a standard turbocharger to constitute a highly capable overall vehicle boosting system. This system could be very responsive and fuel efficient and could provide the high PR the OEM industry will be seeking in coming years.

It is also an object of the present invention to provide means to rapidly accelerate the rotating group of a turbocharger such that the lag that the driver experiences between throttle depression and engine power increase response is reduced.

A further object of the invention is to define a means by which meaningful pumping action "boost" can be achieved at lower ranges of engine speed where the operating speeds of the turbine driven compressor alone are not adequate to develop significant pressure differential to increase engine air induction.

It is yet another object of this invention to define means in which a centrifugal compressor can be powered by hydraulic means alone in a manner, which can be responsive and efficient across all operating speed, ranges.

It is yet still a further object to define a means by which these objectives can be met by a hydraulic system which is integrated to the power steering assist circuit to reduce hardware and increase overall system efficiency.

It is a final object of the invention to define a means by which a pressurized return can be accomplished to avoid cavitations in the pump while under high output flow conditions.

These and other features and advantages of this invention will become apparent upon reading the following specification, which, along with the drawings, describes preferred and alternative embodiments of the invention in detail.

BRIEF DESCRIPTION OF THE DRAWINGS

The present invention will now be described, by way of example, with reference to the accompanying drawings, in which.

Figure 5:
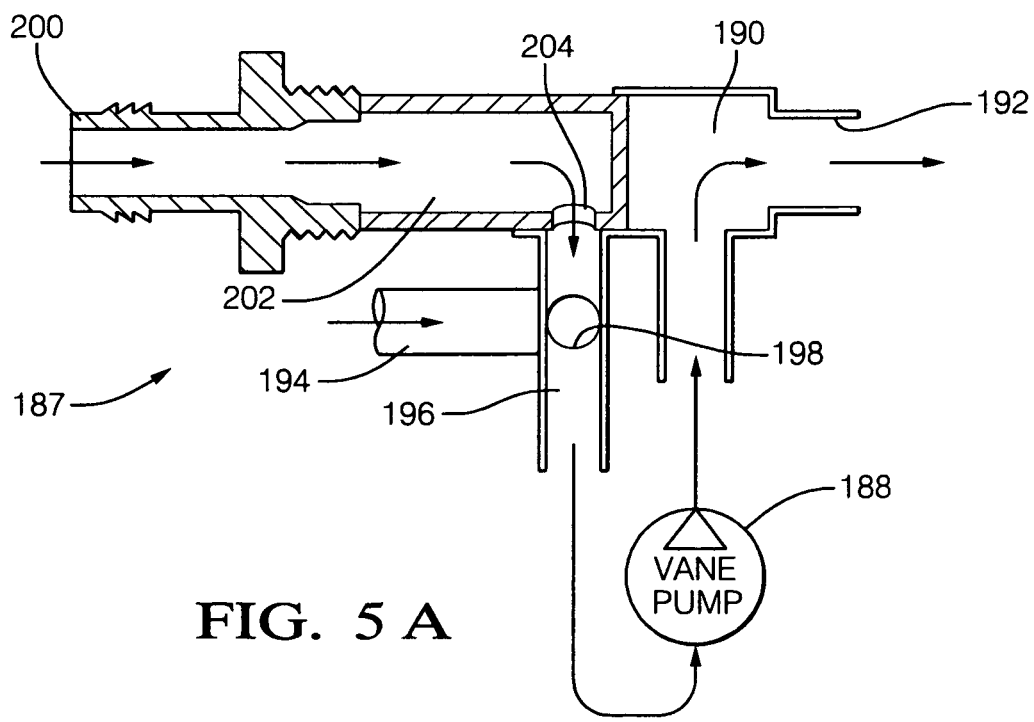
Figure 5:
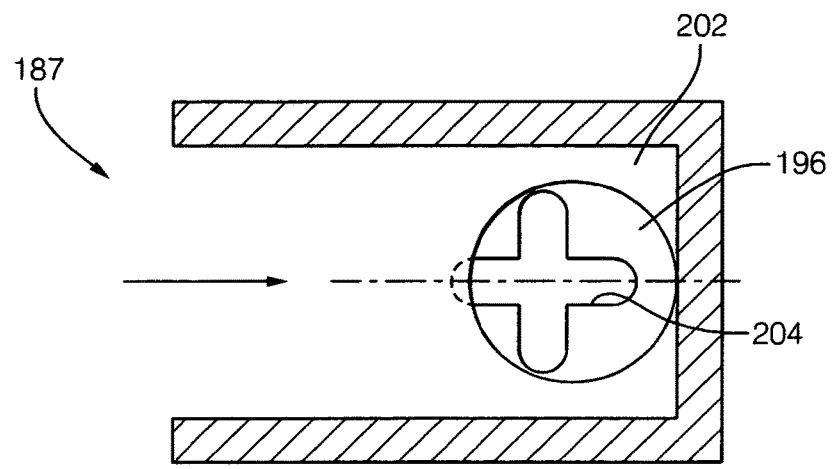
Figure 5:
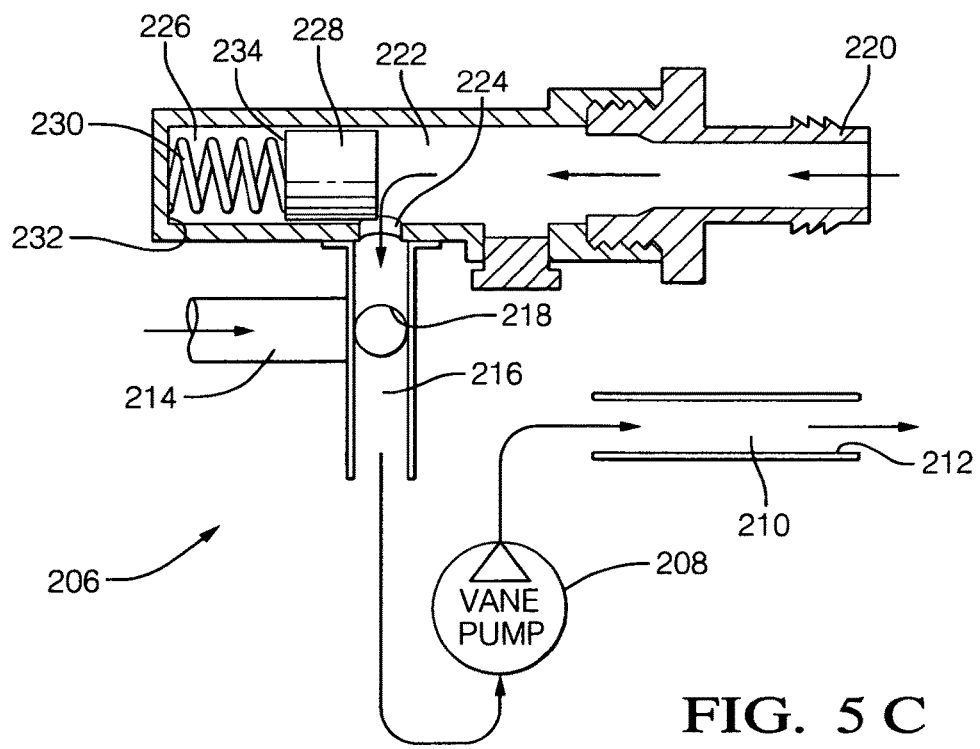
Figure 6A:
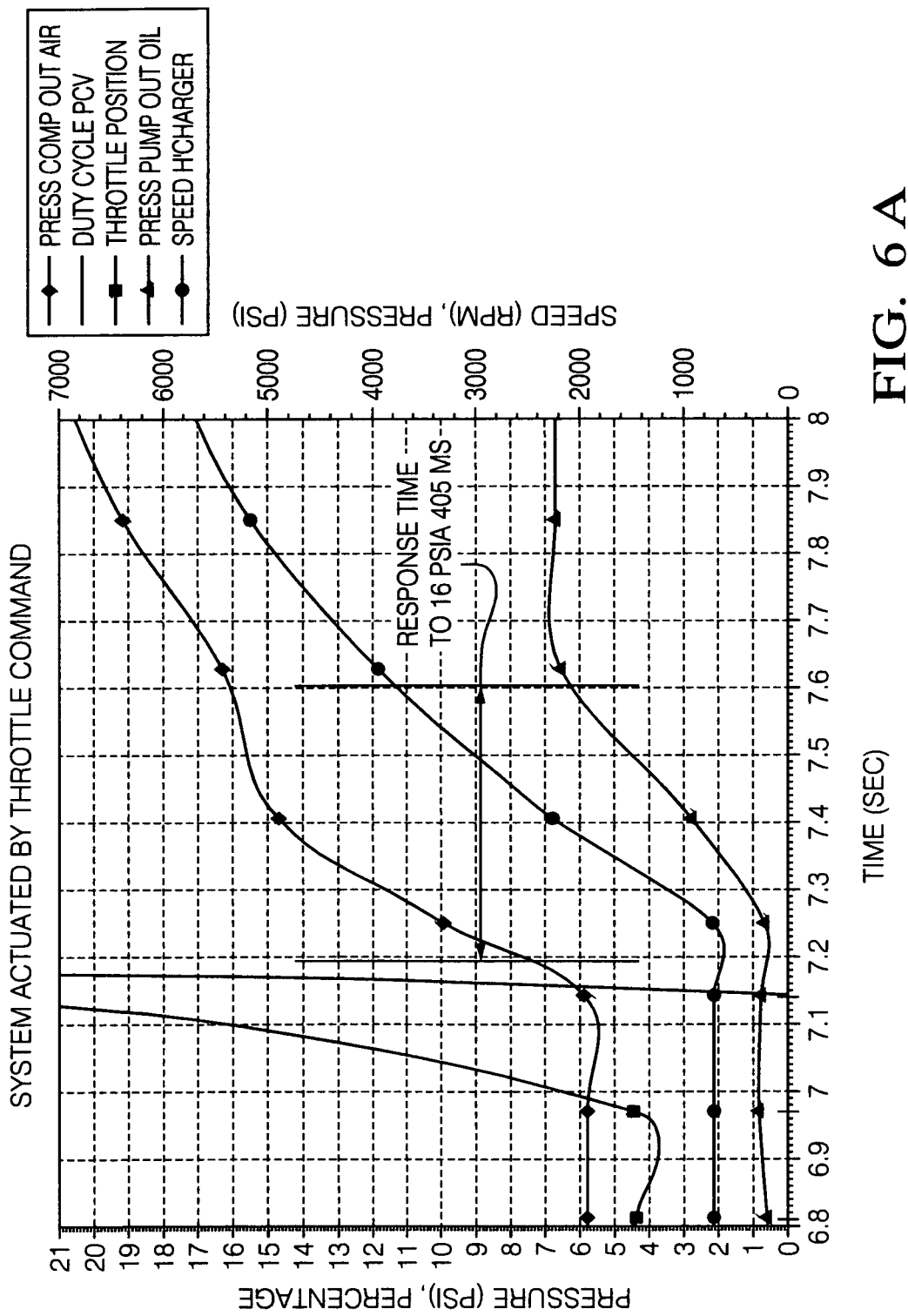
Figure 6B:
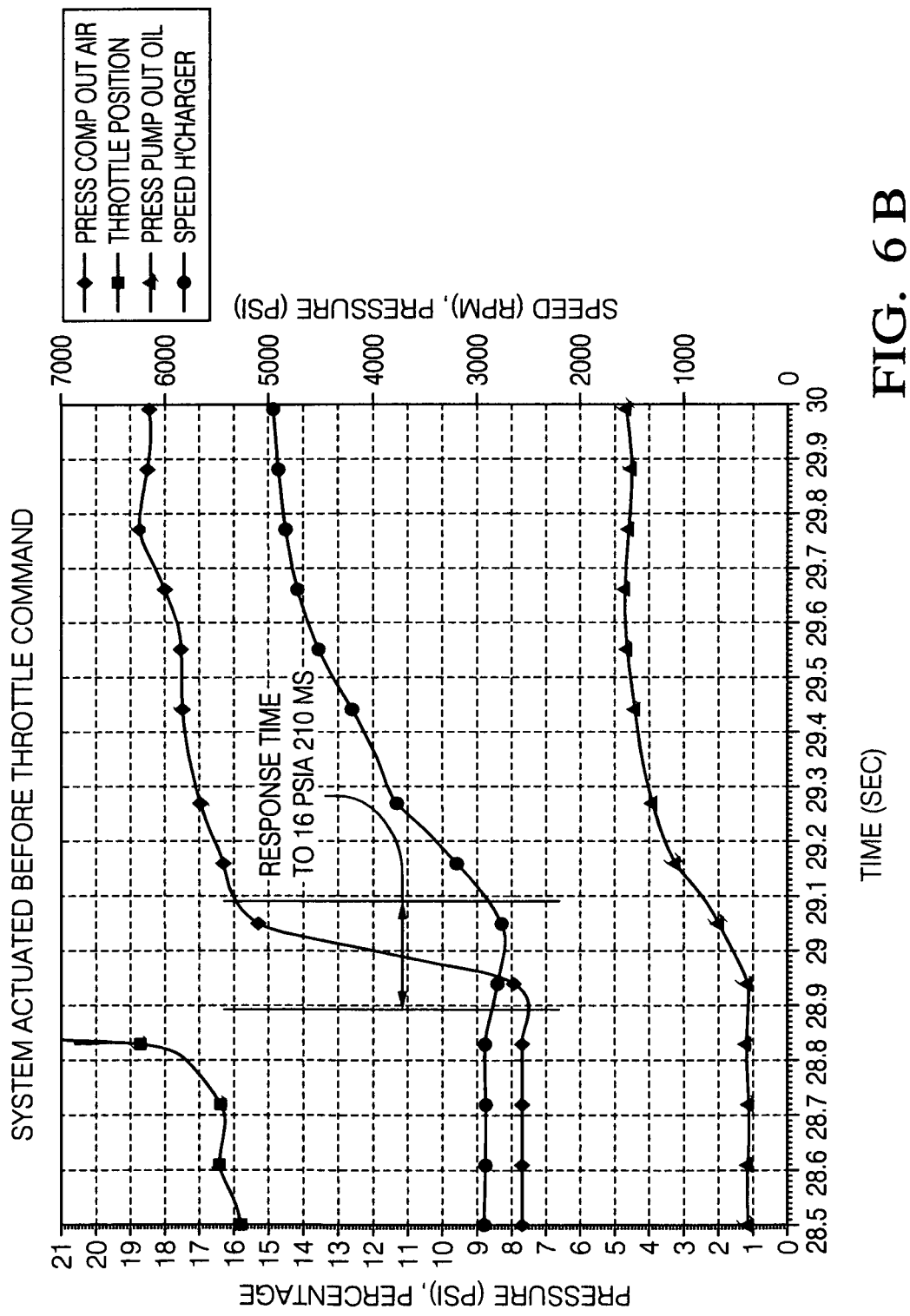
Figure 7:
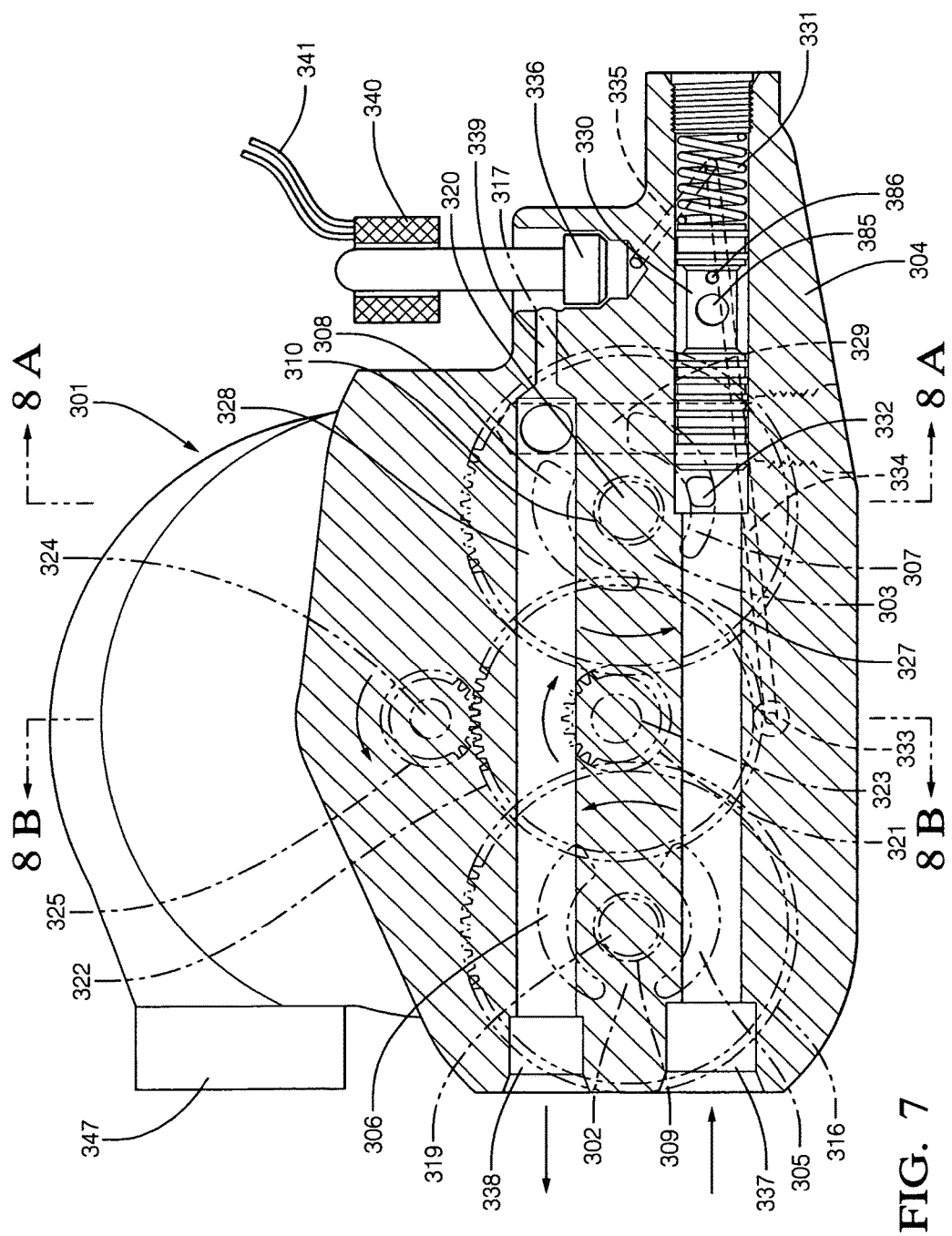
Figure 8A:
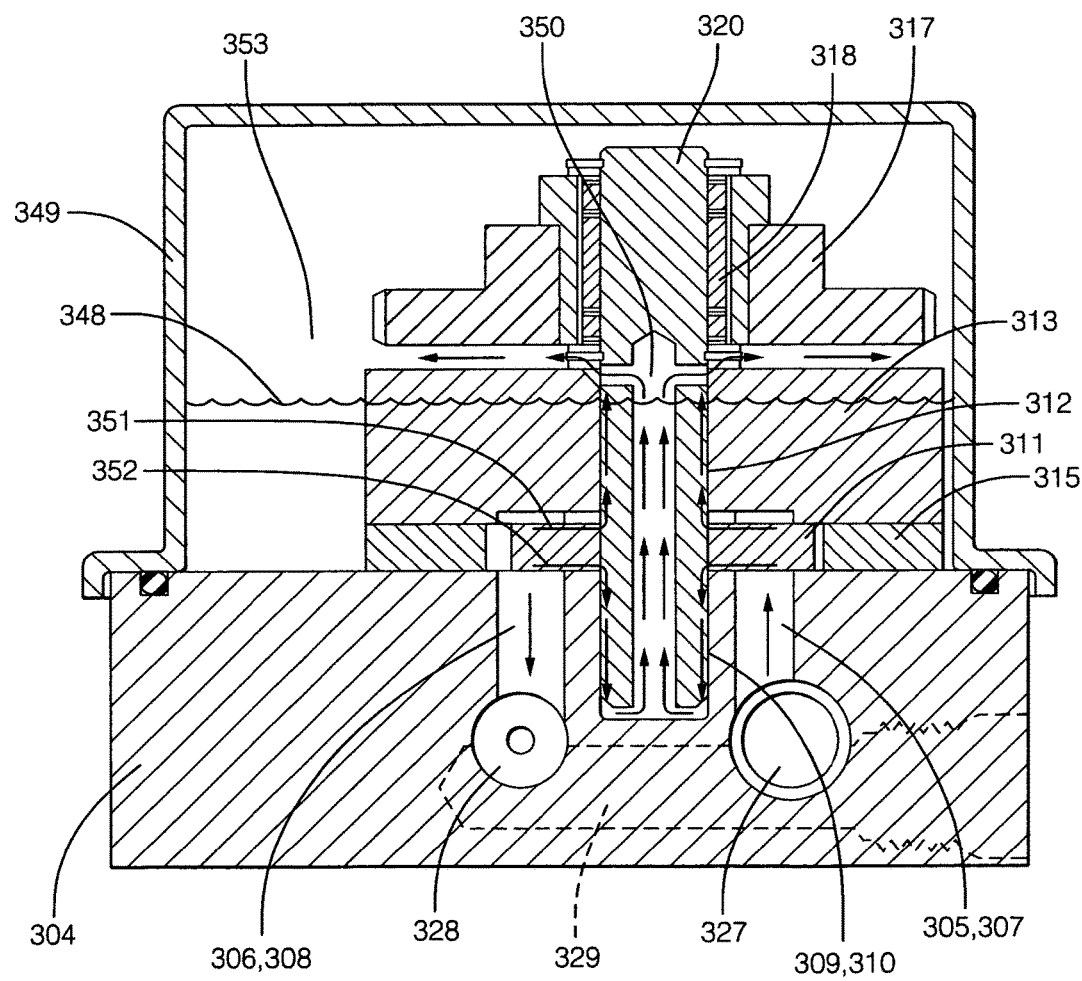
Figure 9:
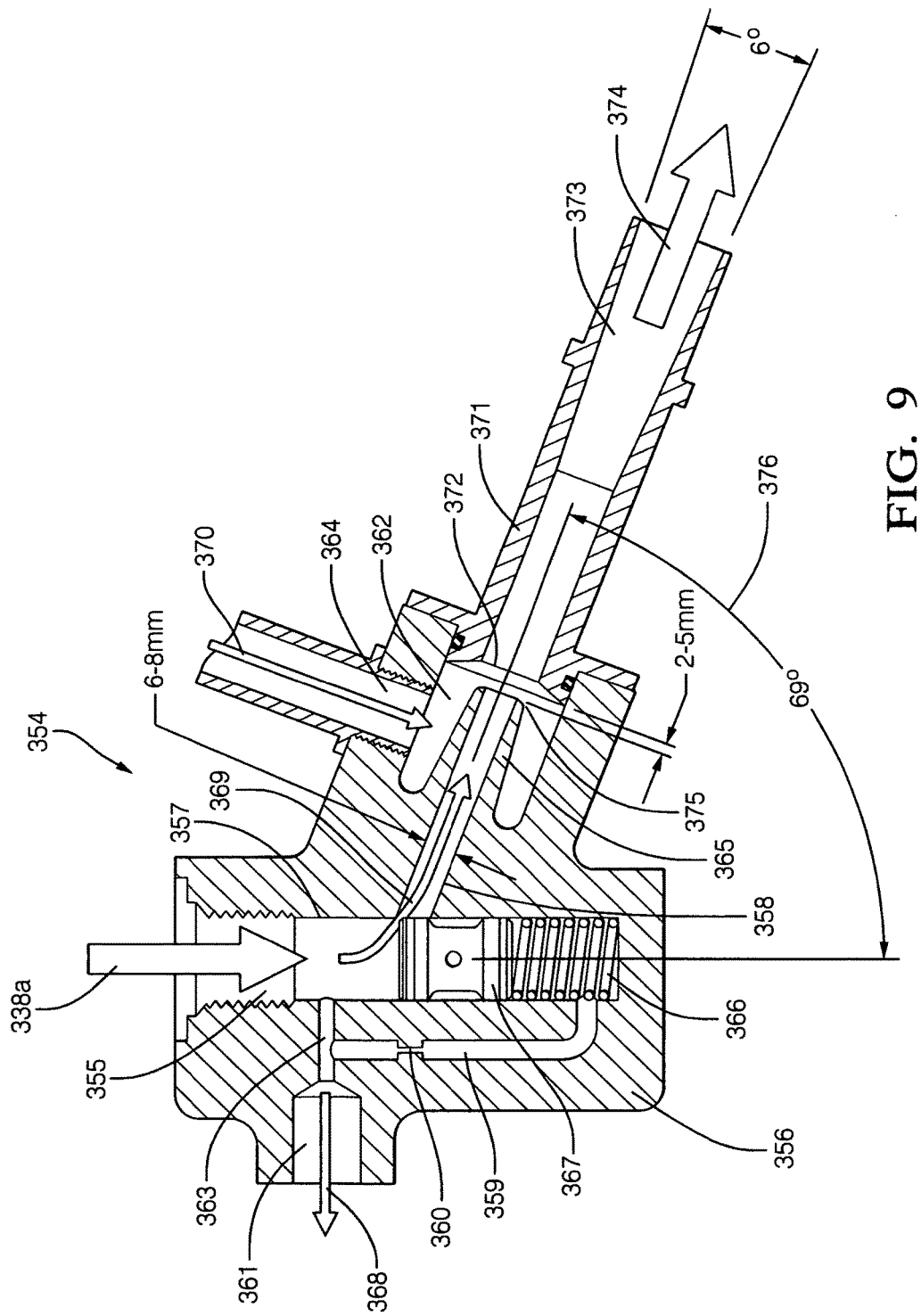
Figure 10:
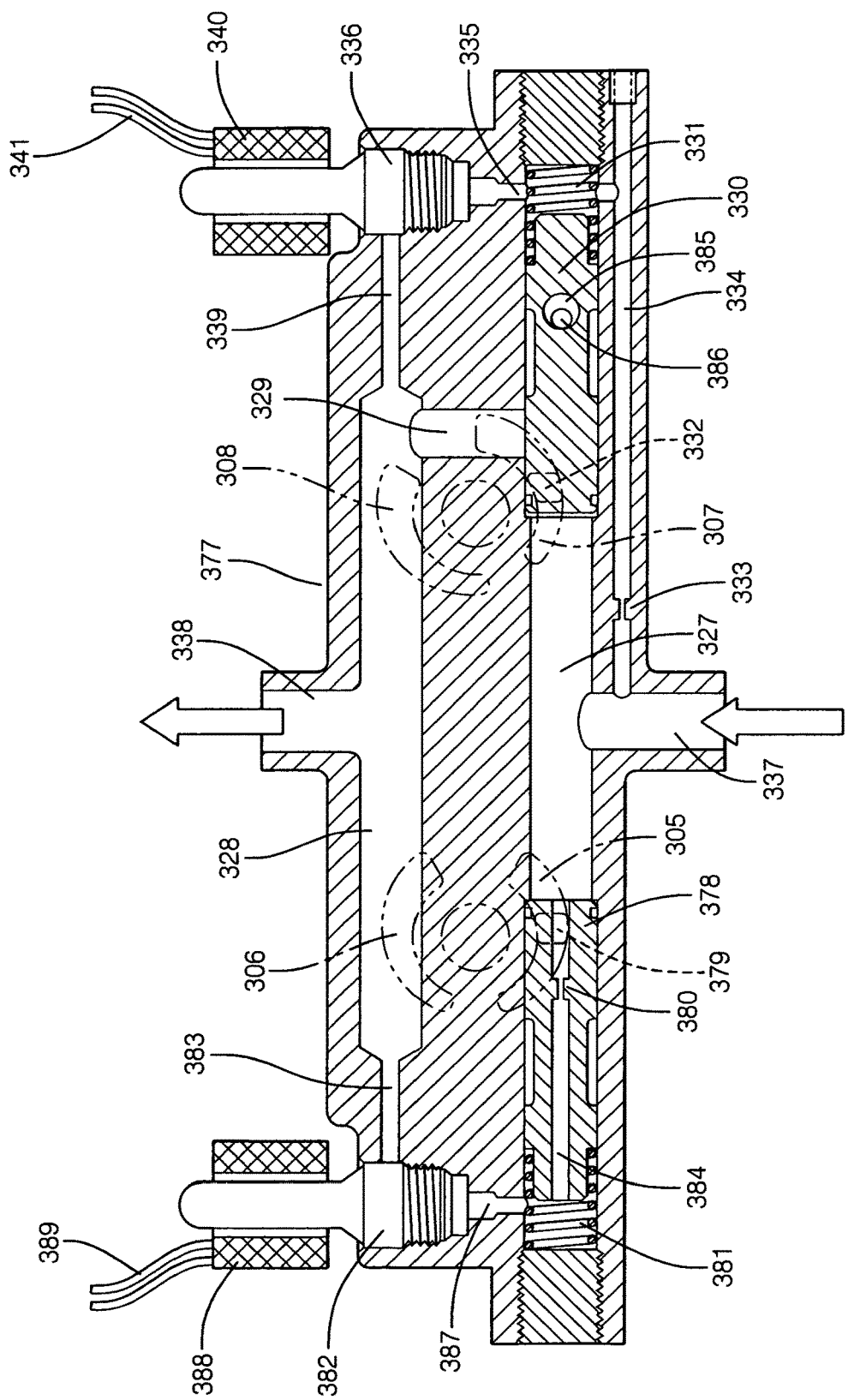
Figure 11:
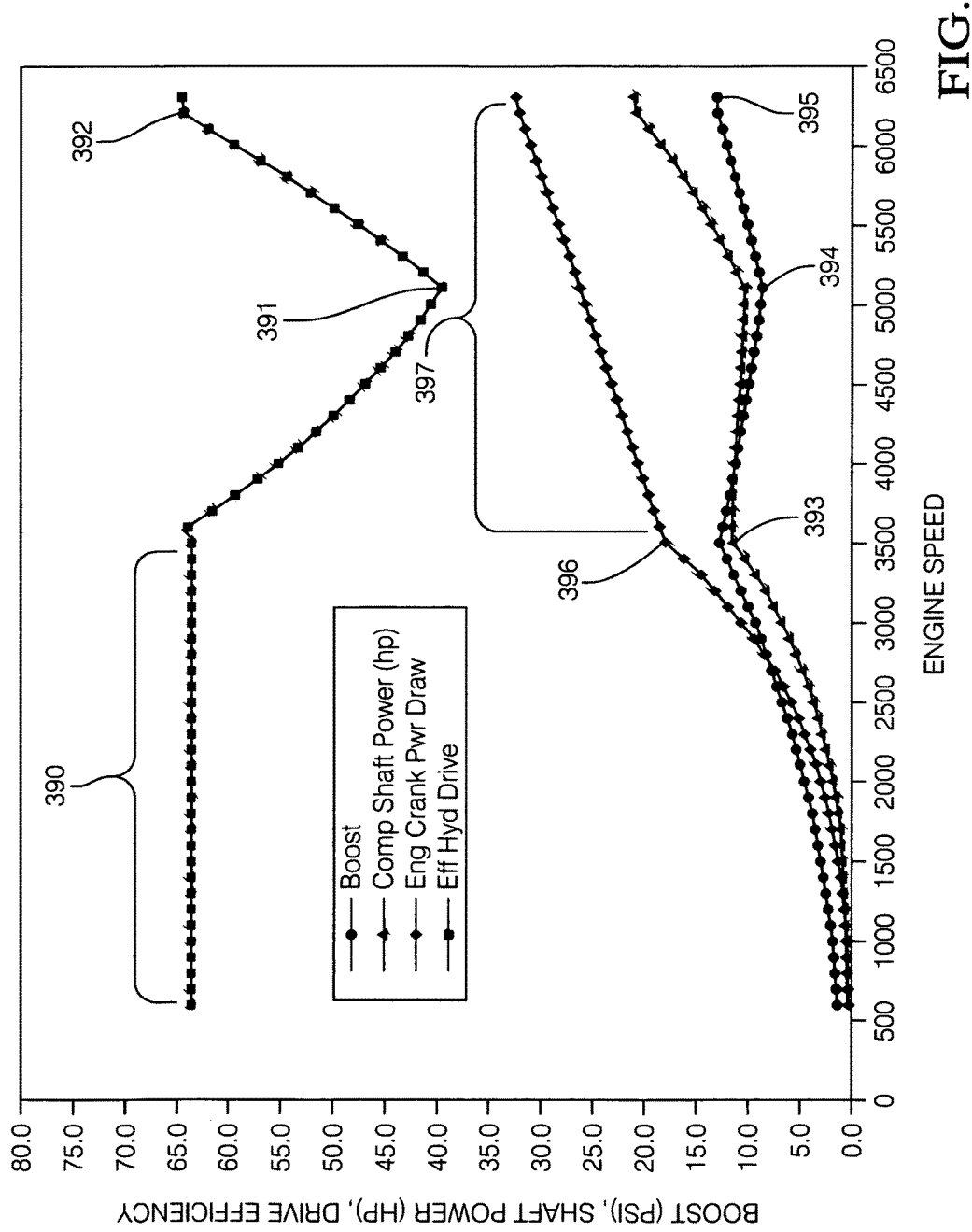
Figure 12:
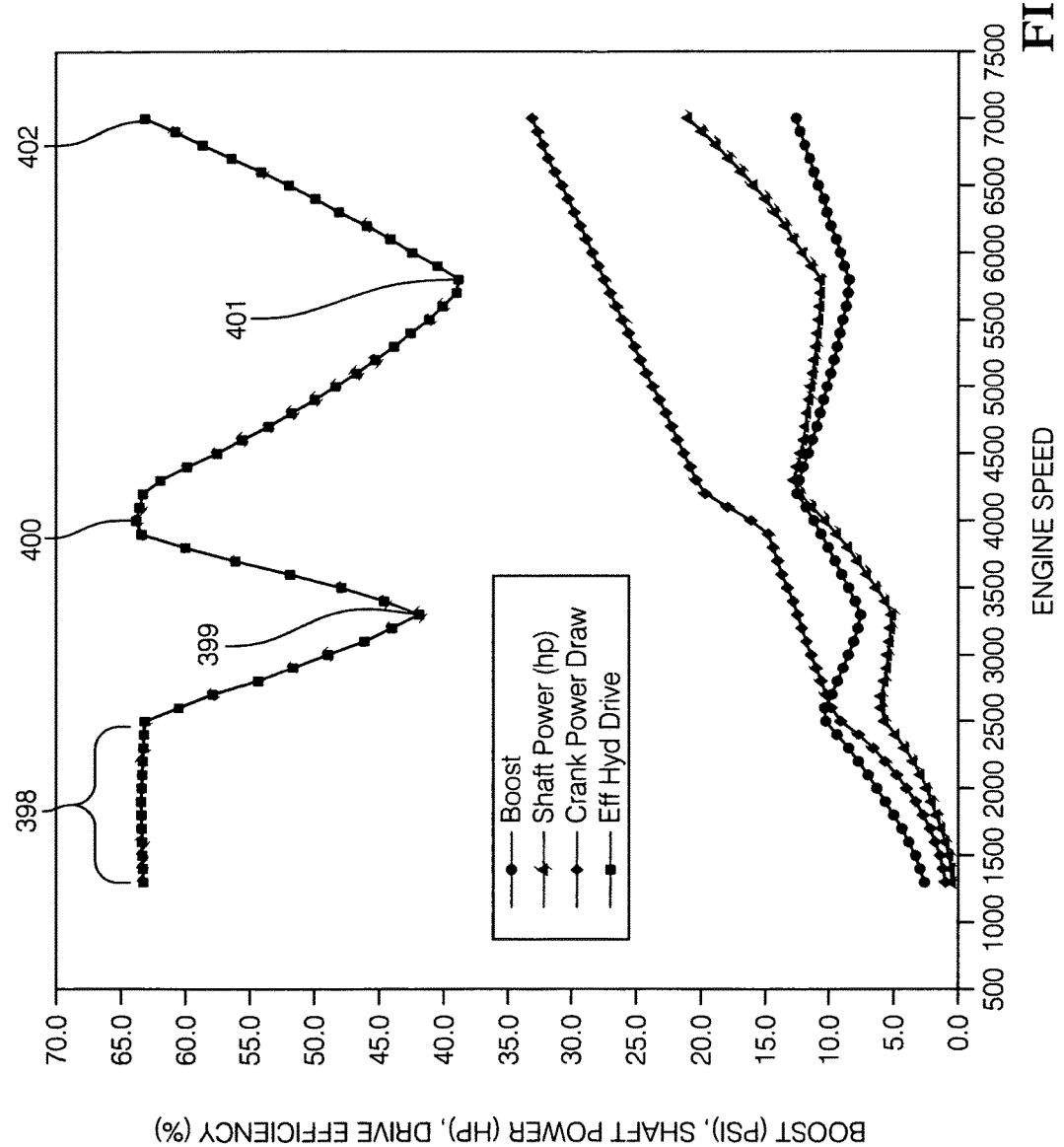
Figure 13:
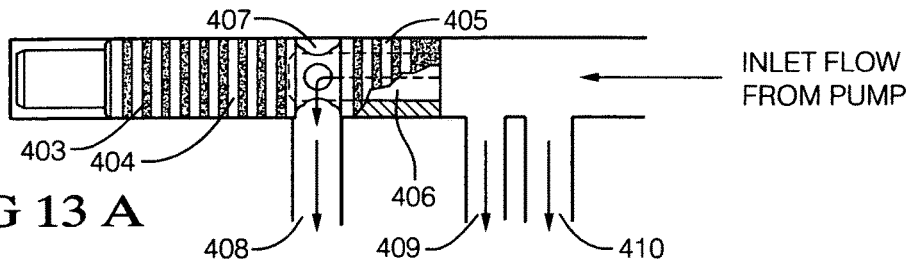
Figure 13:
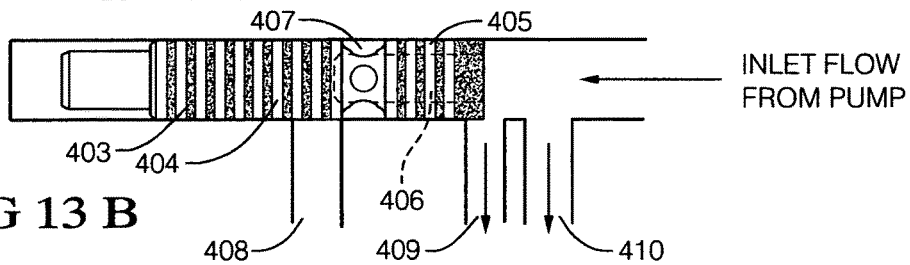
Figure 13:
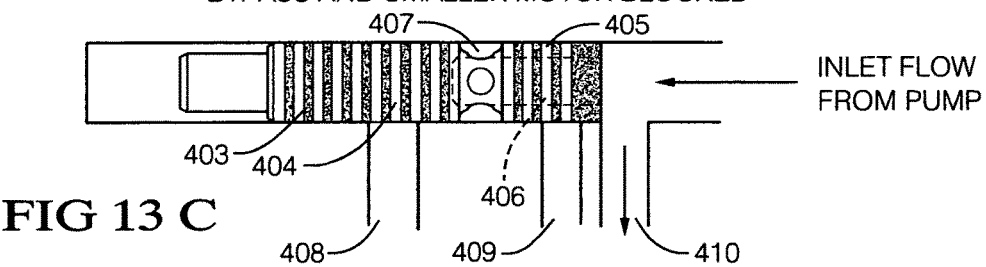
Figure 13:
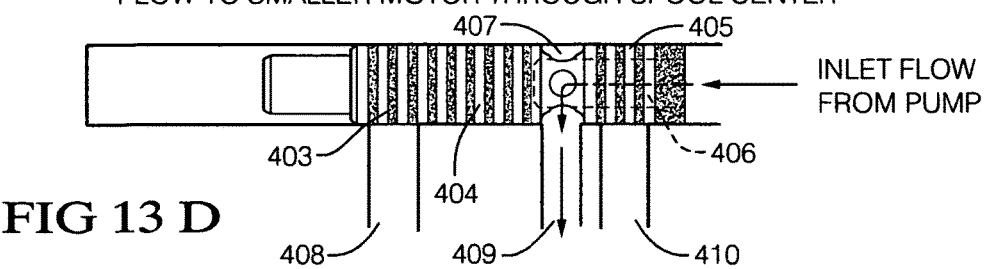
Figure 15:
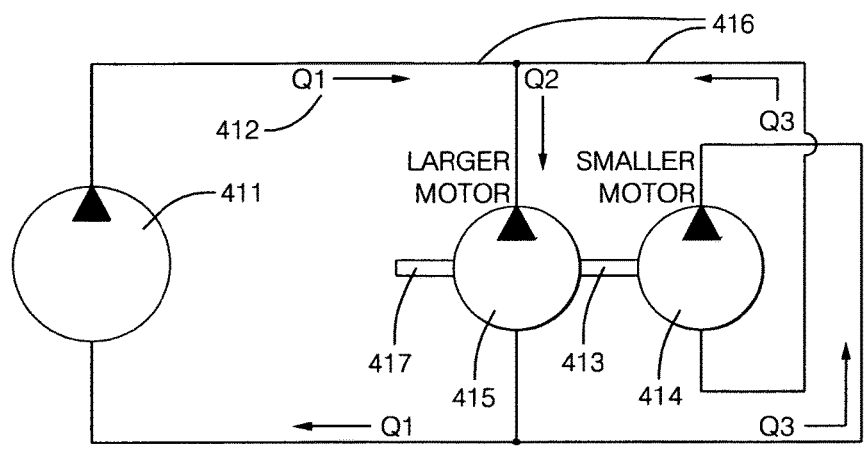
Figure 16:
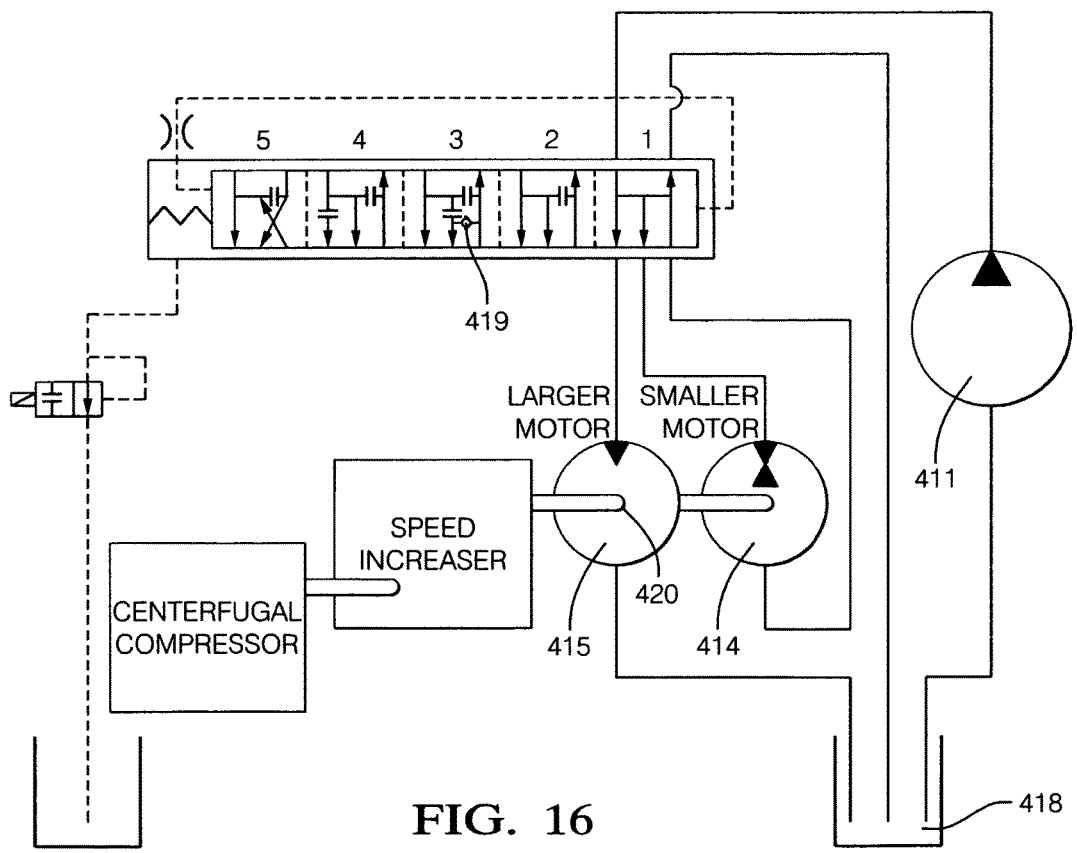
Figure 17:
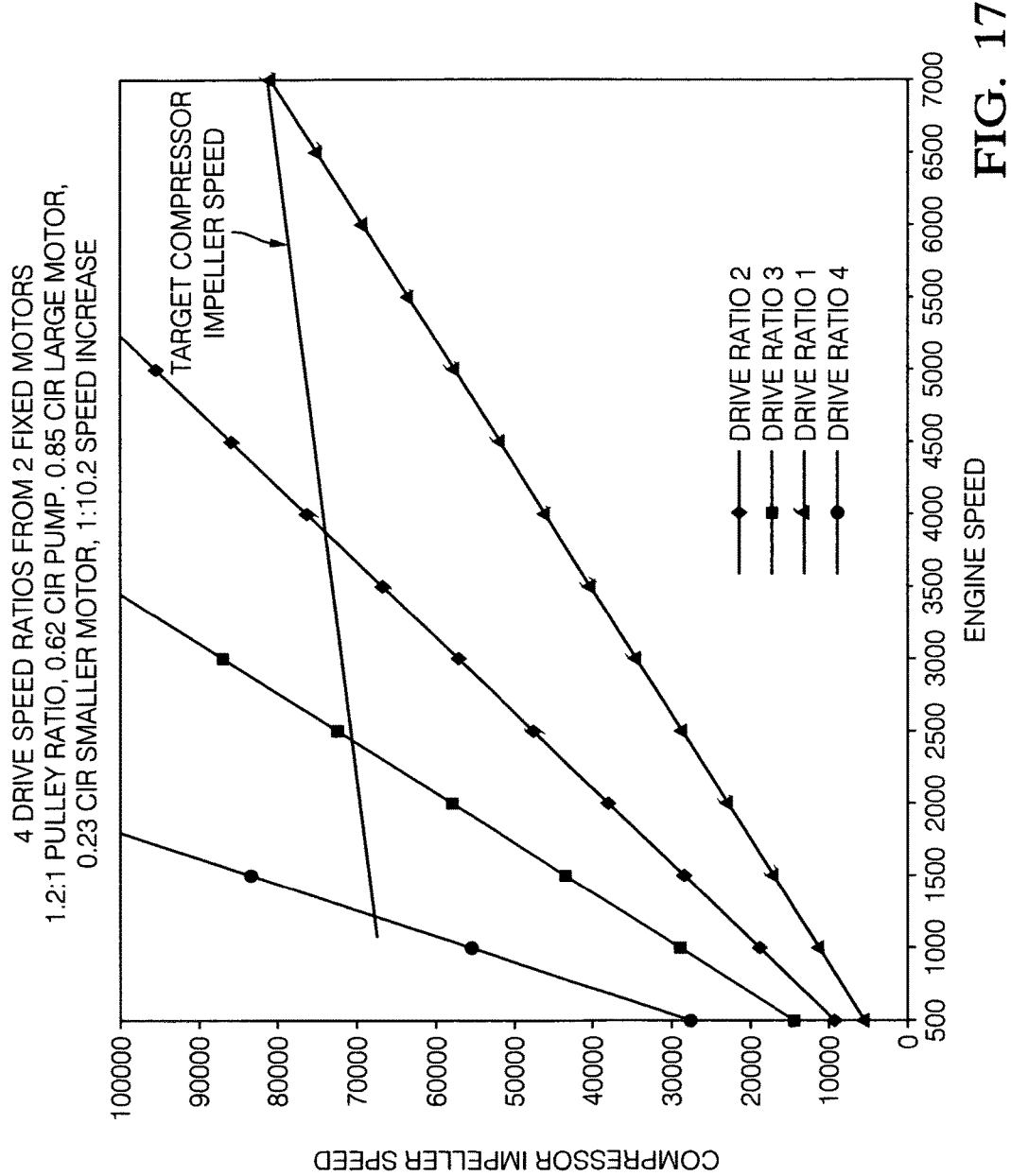
Figure 18:
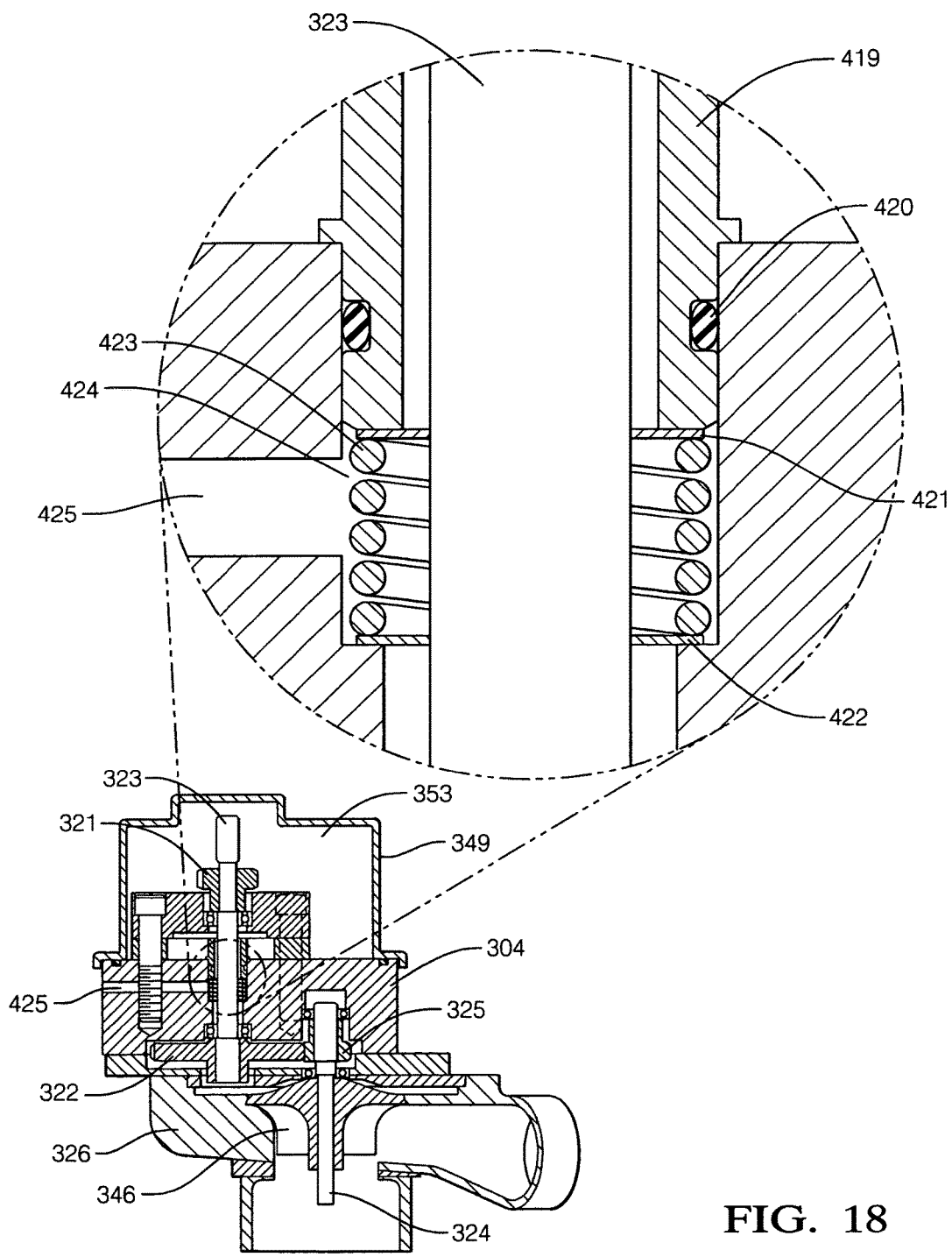
Figure 19:
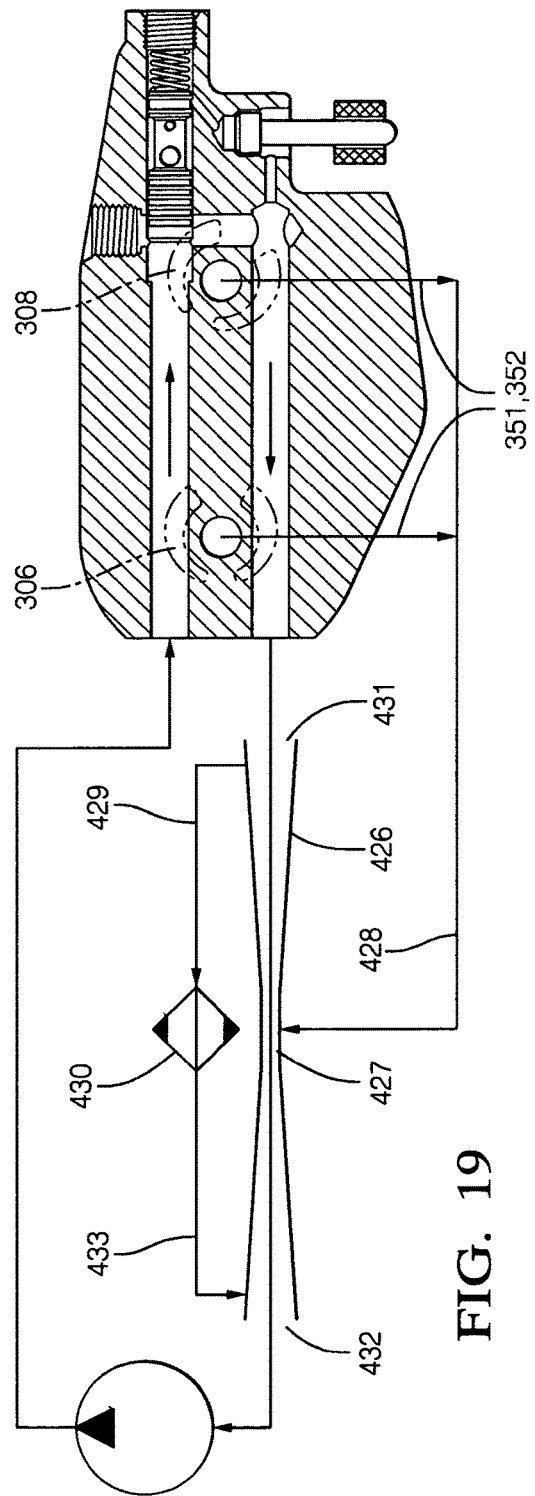
Figure 20:
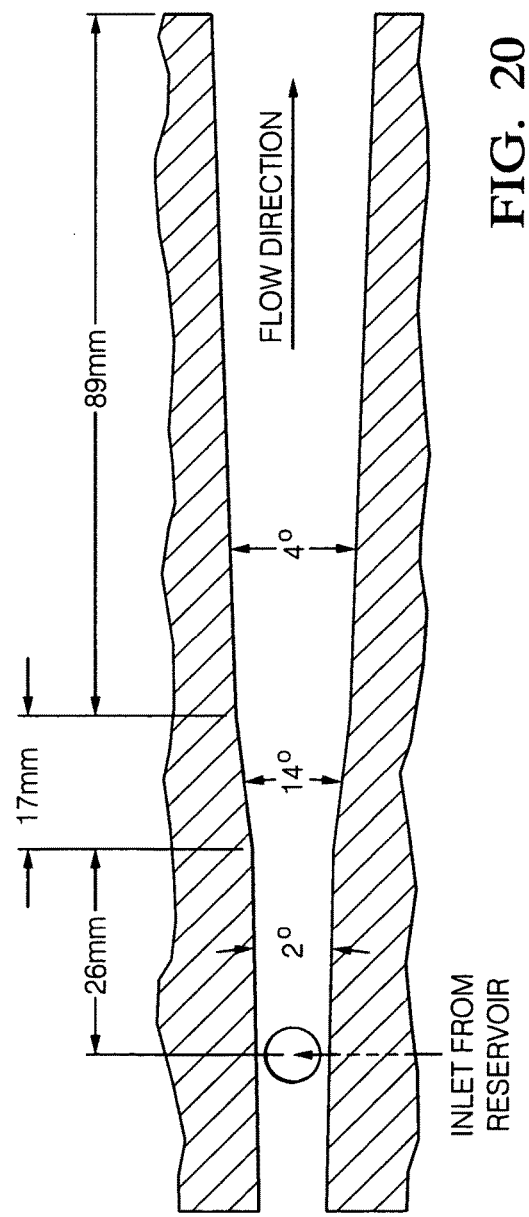
Figure 21:
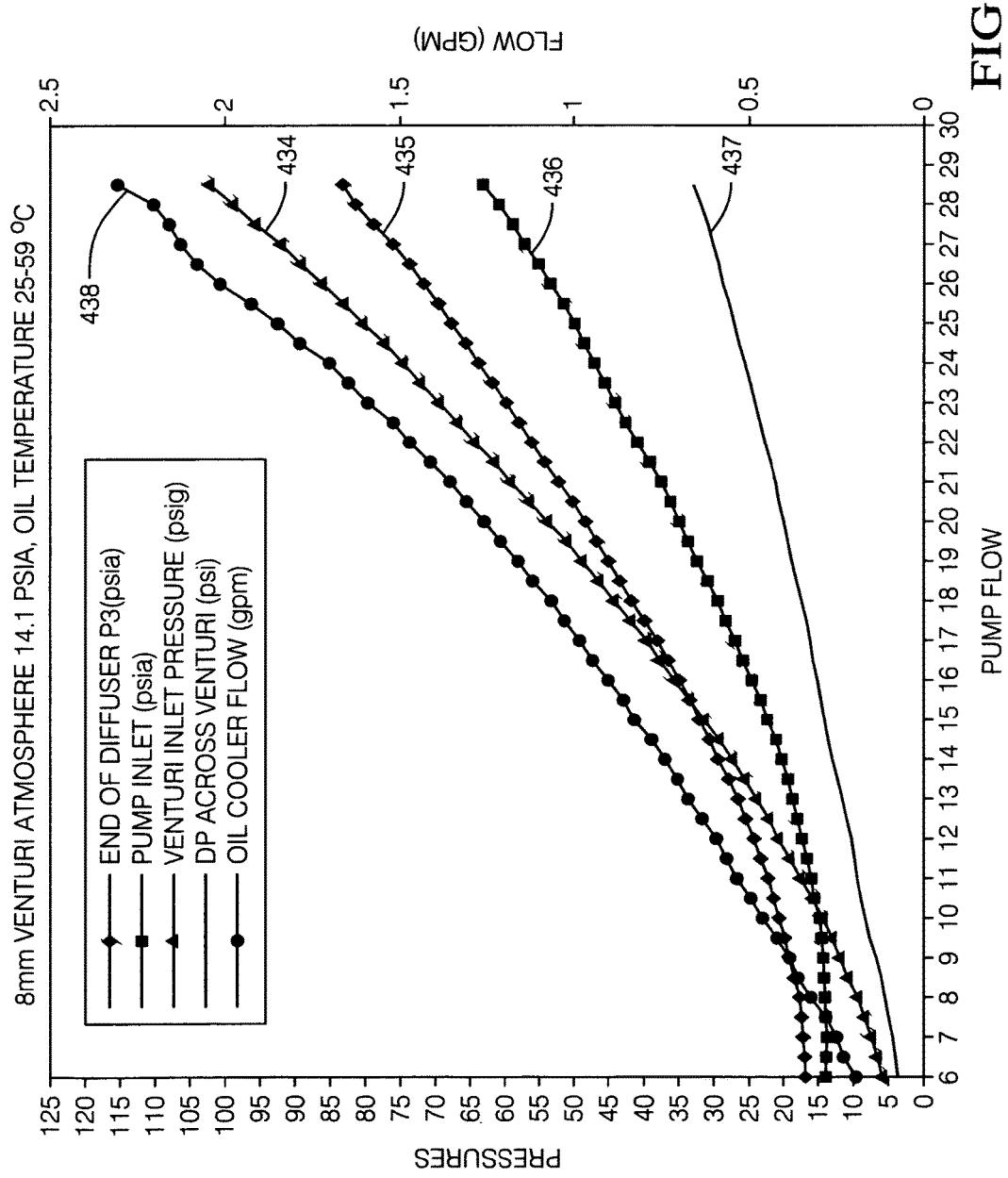
Figure 22:
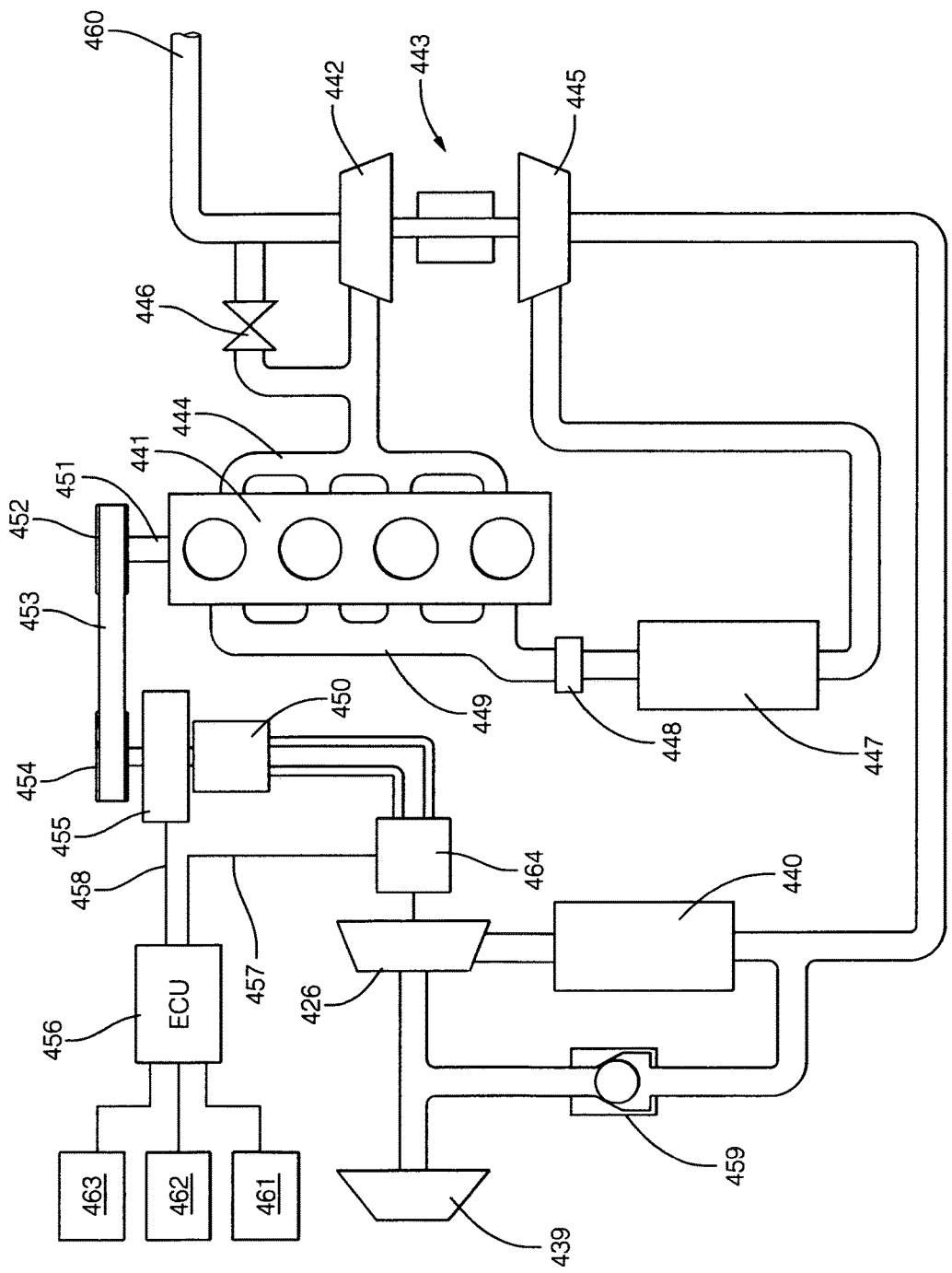
Figure 23:
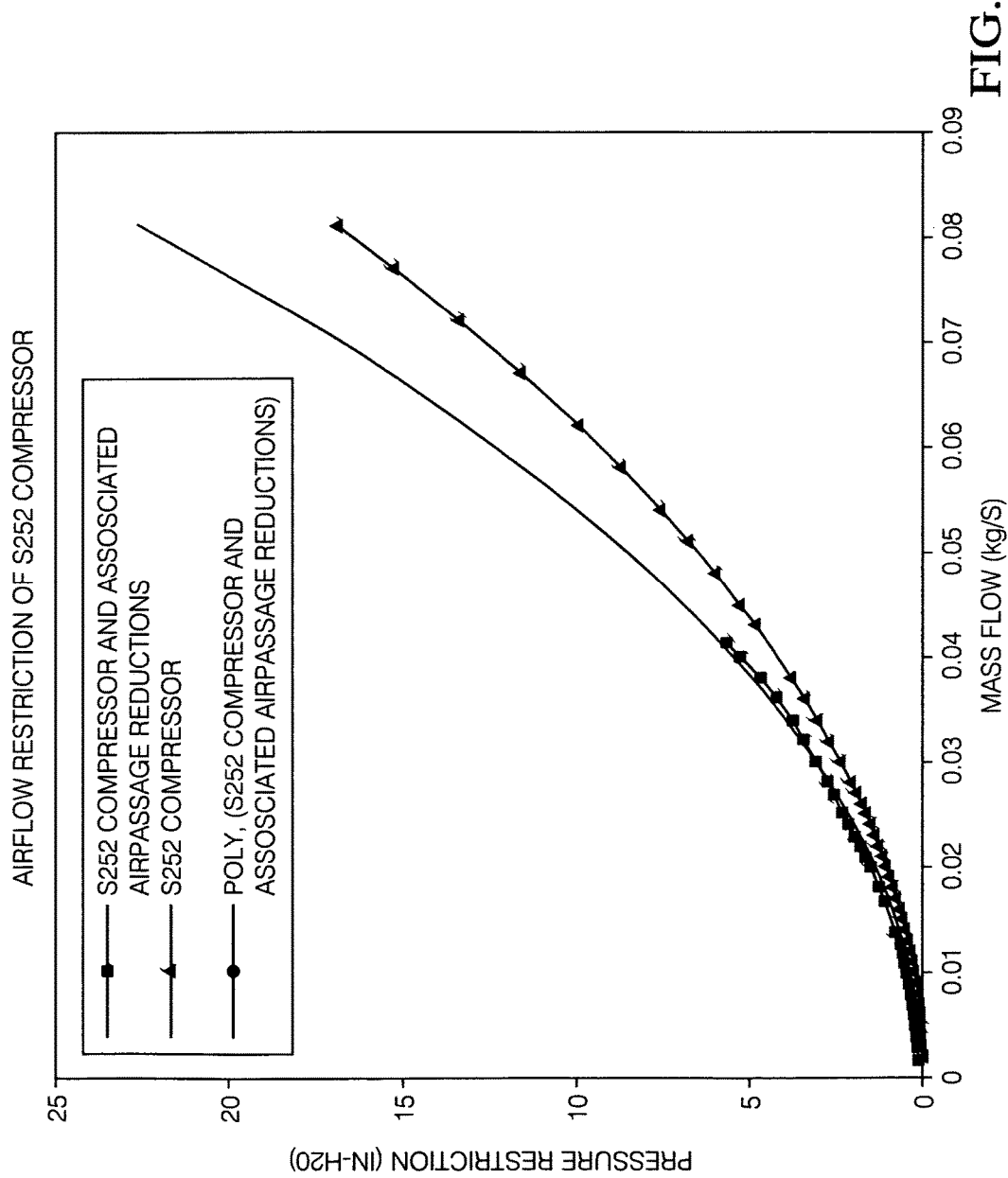
Figure 24:
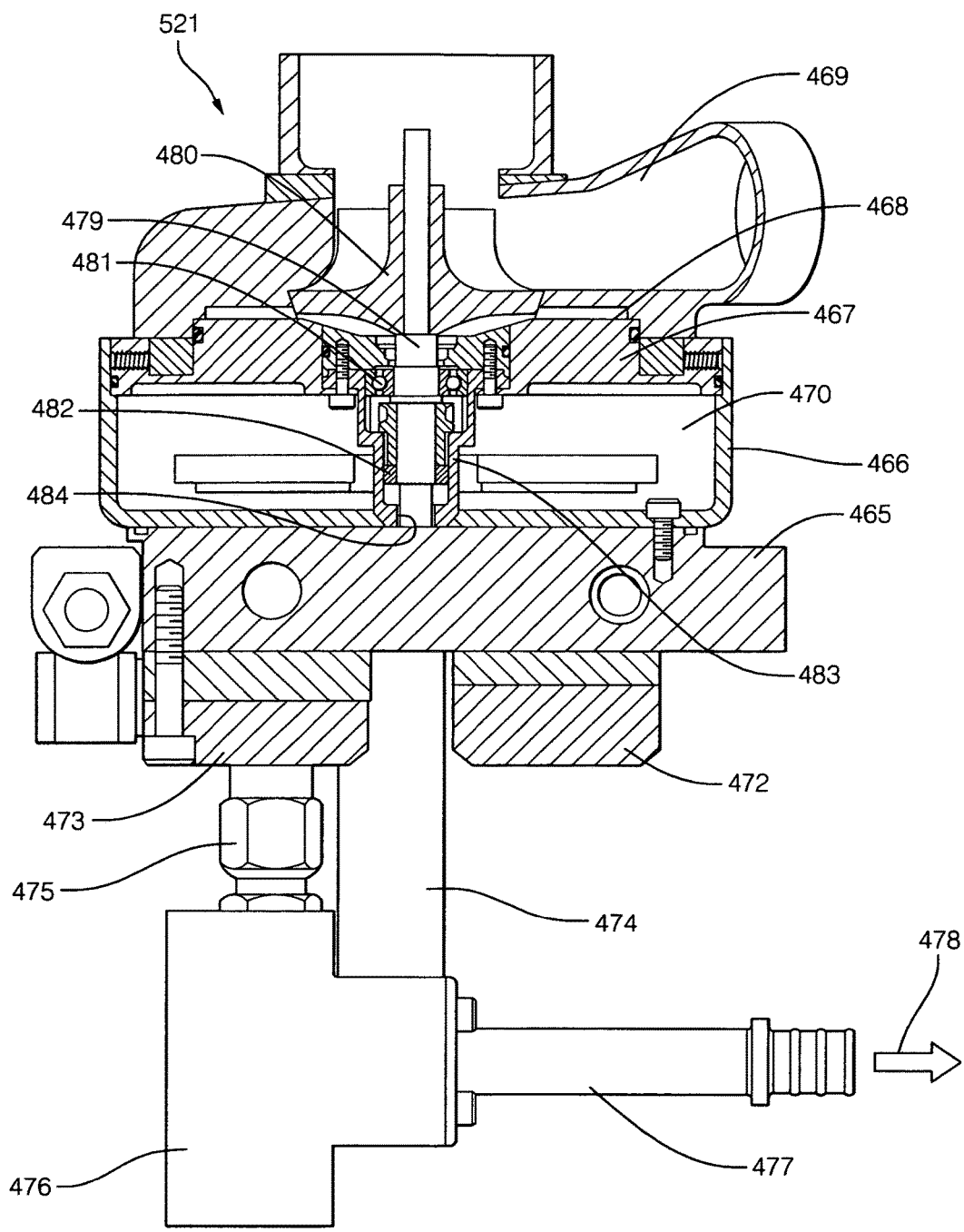
Figure 25:
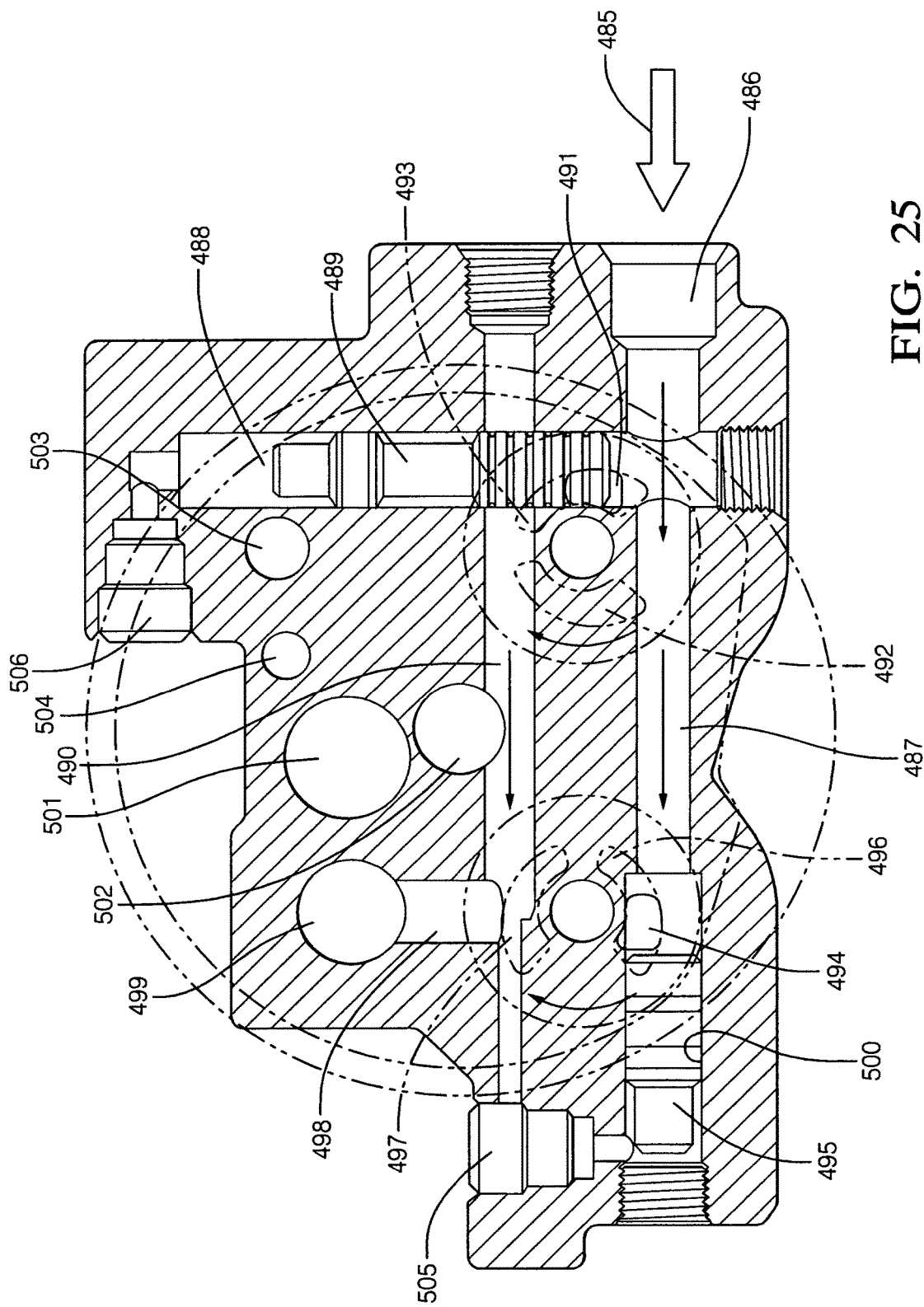

FIG, 4C, defines a workable seal to isolate the hydraulic system from the air intake system;

FIG. 5A, is a diagram of a pump modification used in the system;

FIG. 5B, is a view of the boost nozzle from the pump in figure 5A;

FIG. 5C, is alternate pump configuration;

FIG. 6A indicates response time of system on a vehicle;

FIG. 6B, depicts the improvement in response time with pre-throttle actuation;

FIG. 7, is an overall plan view of an embodiment of a hydraulic compressor drive of the present invention;

FIG. 8A, illustrates detailed cross-section of a portion of one of the motors;

FIG. 8B, illustrates an alternative embodiment of the present invention including detailed cross-section of the gearing;

FIG. 9, illustrates circuitry in the present invention to accommodate an inlet boost to the pump;

FIG. 10, illustrates the addition allows for enhanced system performance with the addition of a second control spool;

FIG. 11, graphically depicts a math model analysis of power transfer and output of a system on a 2.0 liter 4 cycle automotive engine in which only a single motor control spool is employed;

FIG. 12, graphically illustrates the same math model except now a third high efficiency point is added through the addition of the second motor control spool;

FIG. 13A, illustrates an embodiment allowing the three drive ratio speeds to be achieved without the addition of a second solenoid control valve wherein the topmost of the four depictions in the illustration shows the system with the spool in the furthest left or bypass position;

FIG. 13B, illustrates where the spool has moved to the right now closing off access to the bypass port;

FIG. 13C, illustrates where the spool has advanced further to the right producing a yet higher system pressure applied to the loads;

FIG. 13D, illustrates where the spool is in its furthest to the right position the system pressure at the defined inlet flow is at its highest;

FIG. 14, defines math quantities of a preferred control system;

FIG. 15, illustrates an additional modification wherein if both motors are receiving flow from a pump coupled to the same shaft and the smaller motor is plumbed in reverse direction becoming a pump a fourth drive ratio can be obtained;

FIG. 16, illustrates a general hydraulic schematic of such a circuit to provide 4 speed ratios from 2 fixed displacement motors;

FIG. 17, illustrates an analysis of such a 4 drive ratio system indicating how it can be utilized to allow a mechanism with just two fixed displacement motors to yield performance approaching that of a much more complex and costly infinitely variable pump or motor system;

FIG. 18, illustrates another packaging embodiment of the two stage step up gearing to isolate the compressor from the hydraulic drive;

FIG. 19, illustrates an embodiment of the circuit without integration to a hydraulic steering system;

FIG. 20, illustrates preferred dimensional characteristics of the venturi tube arrangement of FIG. #19;

FIG. 21, graphically depicts the performance of the venture tube dimensions of FIG. 20;

FIG. 22, illustrates an arrangement of the subject hydraulic drive used in series configuration with a conventional turbocharger;

FIG. 23, graphically depicts the performance effect of the restriction to air flow of a unpowered smaller compressor as potentially used in the present invention;

FIG. 24, is a side view of an alternative embodiment of manifold of the present invention enabling more application flexibility and extremely low tool investment;

FIG. 25, is a top plan view of the manifold of FIG. 24; and

Figure 26:
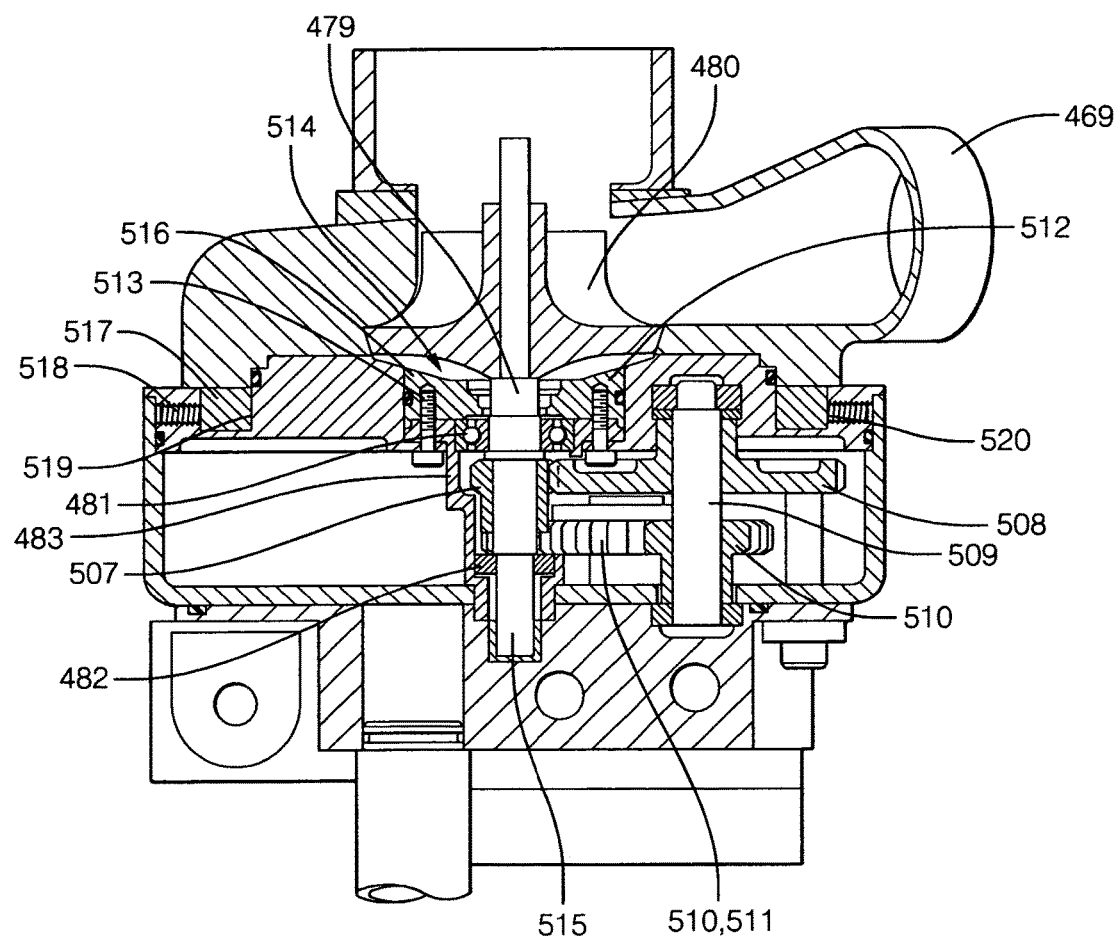

FIG. 26, is an alternative embodiment of a compressor housing and impeller support of the manifold of FIG. 24.

Although the drawings represent several embodiments of the present invention, the drawings are not necessarily to scale and certain features may be exaggerated in order to illustrate and explain the present invention. The exemplification set forth herein illustrates embodiments of the invention, in several forms, and such exemplifications are not to be construed as limiting the scope of the invention in any manner.

DESCRIPTION OF THE PREFERRED EMBODIMENT

The present invention is identified by the applicant as a HydraCharger™ or forced air induction system, which redeploys existing automotive radiator fan drive technology. The forced air induction system is cost effective and easily adaptable for a wide range of vehicle applications. The system is electronically controlled, hydraulically powered and remotely mounted for easy packaging. Independence from the vehicle engine and exhaust reduces vehicle level costs and avoids adverse emissions issues.

The present invention provides supercharger response on electronic command. The forced air induction system's variable positive displacement hydraulic drive delivers full torque virtually instantaneously upon command from an associated electronic control module (ECM). This accelerates a reliable, efficient and low cost centrifugal compressor to a speed required to create boost in under 300 ms. At low throttle demand, the engine returns to naturally aspirated mode through the unpowered compressor wheel.

The present invention can be implemented with a stand alone power source on a vehicle accessory drive. However, integration to a traditional hydraulic steering system, as on automotive fan drives, is more cost effective and may be a better overall alternative to an electric power steering and turbo combination.

The present invention is intended for application in varied automotive vehicle applications and will be described in that context. It is to be understood, however, that the present invention could also be successfully applied in many other applications. Accordingly, the claims herein should not be deemed limited to the specifics of the preferred embodiments of the invention describer hereunder.

Figure 1:
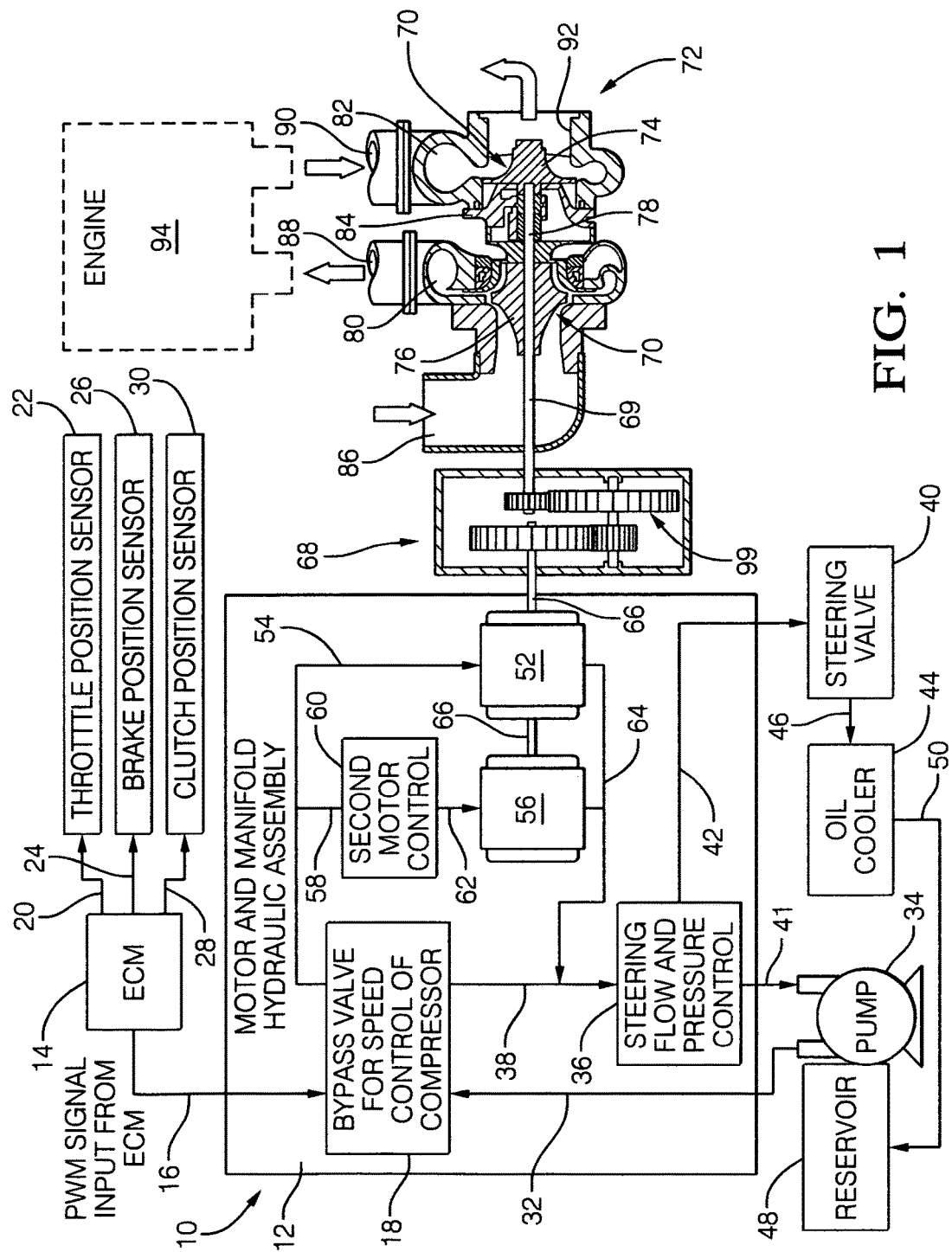
FIG. 1, is an overall view of the circuit and turbo mechanism at vehicle level.

Referring to FIG. 1, a functional schematic of a supercharger drive/accelerator circuit 10 embodying the present invention is illustrated. The supercharger drive/accelerator circuit 10 is substantially integrated within a motor and manifold hydraulic assembly 12. The motor and manifold hydraulic assembly 12 receives PWM input control signals from an electronic control module (ECM) 14 via an input line 16 feeding a bypass valve 18 for speed control of a compressor within the motor and manifold hydraulic assembly 12. The ECM 14 is typically part of the controller of a host vehicle (not illustrated) or, can be a dedicated portion of the supercharger drive/accelerator circuit 10.

The ECM 14 has numerous power and control signal feeds, including a feed line 20 from a host vehicle throttle (pedal) position sensor 22, a feed line 24 from a host vehicle brake condition sensor 26, and a feed line 28 from a host vehicle clutch condition sensor 30. Thus configured, the PWM input signal(s) include information relating to vehicle operator speed/(de)acceleration demand, as well as information anticipatory of a driver's intention to alter speed/(de)acceleration demand by activating brake and/or clutch control momentarily before modulating the vehicle throttle, enabling a "sport mode" and a separate "economy mode" of system control.

The bypass valve 18 receives pressurized hydraulic fluid via a conduit 32 from a system feed pump 34. The bypass valve 18 has a first output port feeding hydraulic fluid to a steering flow and pressure control circuit 36 through a conduit 38. The steering flow and pressure control circuit 36 has a first hydraulic fluid outlet interconnected with an inlet port of the pump 34 through a conduit 41. The steering flow and pressure control circuit 36 has a second hydraulic fluid outlet interconnected with an inlet port of a hydraulic power steering valve 40 of the host vehicle through a conduit 42. The steering valve 40 has an outlet port interconnected with an inlet port of an oil cooler 44 through a conduit 46. The oil cooler 44 has an outlet port interconnected with a reservoir 48 through a conduit 50. The reservoir 48 is in assembly with the pump 34 to act as an accumulator/buffer and to return hydraulic fluid to the pump 34.

The bypass valve 18 has a second output port feeding hydraulic fluid in parallel to the inlet port of a first or primary hydraulic motor 52 through a conduit 54, and to the inlet port of a secondary hydraulic motor 56 through a series interconnected first conduit 58, a second motor control circuit 60, and a second conduit 62. The outlet ports of both hydraulic motors 52 and 56 are commonly fed to the inlet port of the steering flow and pressure control circuit 36 through a conduit 64. The hydraulic motors can be of a number of types such a positive, variable or defined displacement type.

Thus constructed, the circuit 10 employs common components to define a power steering hydraulic control circuit and a forced air induction system hydraulic control circuit for a common host vehicle.

The hydraulic motors 52 and 56 have a common or unitary output drive shaft 66 providing a driven input to a speed step-up or speed increaser mechanism 68 which, in turn, has an output drive shaft 69 which drives the rotating assembly 70 of a turbocharger 72. The rotating assembly 70 comprises a turbine wheel 74 and a compressor wheel 76 connected on opposite ends of a common turbocharger shaft 78. The shaft 78 is rotatably supported by a pair of journal bearings and an associated thrust bearing unit within a center housing 84. The turbine and compressor wheels 74 and 76 are positioned respectively within turbine and compressor housings 82 and 80 which are mounted onto a center housing 84 in a conventional manner. The turbine housing 82 includes an engine exhaust gas inlet port 90 and an exhaust gas outlet port 92. Likewise, the compressor housing 80 includes an air inlet port 86 and an air outlet port 88. Ports 90 and 92, and ports 88 and 86, respectively, are in fluid communication with the exhaust and air induction systems of a host vehicle internal combustion engine 94 in a known manner.

With the exceptions described herein, the centrifugal compressor 72 employed in the present invention is substantially similar to known designs described in the art cited and incorporated herein. Accordingly, its detailed structural features will not be included here for the sake of brevity.

Figure 2:
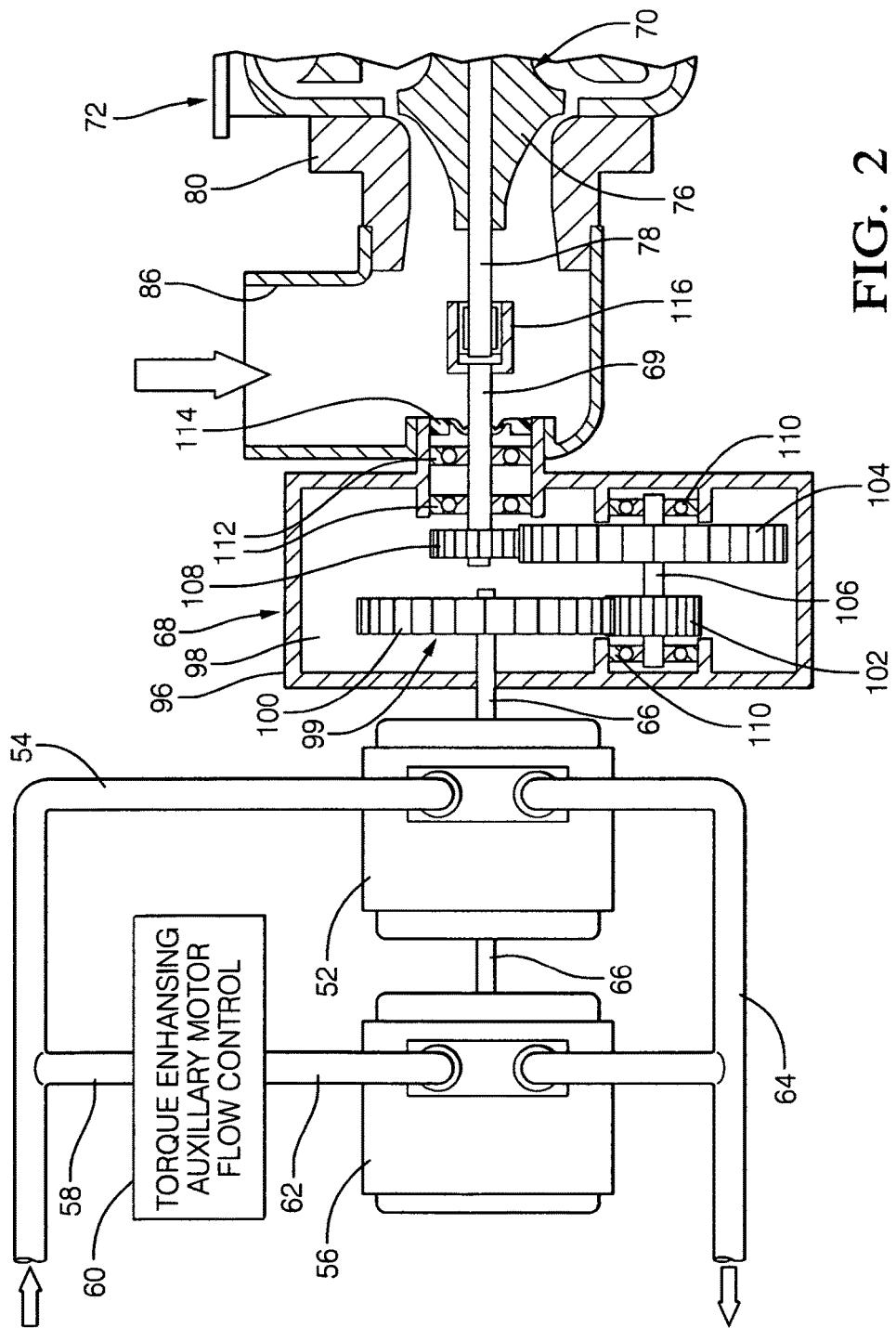
FIG. 2, is a more detailed view of the motor, gearbox and turbo interface.

Referring to FIG. 2, the speed step-up mechanism 68 includes a closed housing 96 forming a substantially sealed cavity 98 containing a speed increasing gear set 99 (preferably of the helical type) including an input gear 100 mounted and carried for rotation on the cantilevered end of the output drive shaft 66. The input gear 100 is in rolling engagement with a first idler gear 102 which is disposed for co-rotation with a second idler gear 104 on a common idler shaft 106. The second idler gear 104 is in rolling engagement with an output gear 108 mounted and carried for rotation on the cantilevered end of the output drive shaft 69. The opposed ends of the idler shaft 106 are supported by inner surface features of the housing 96 by roller bearings 110. Likewise, output drive shaft 69 is supported by inner surface features of the housing 96 by high speed roller bearings 112 and a seal 114.

The illustrated gear set 99 is intended to merely illustrate the functional concept of the speed step-up mechanism 68. As will be obvious to one skilled in the art, additional gear pairs can be added to gear set 99 to establish a desired step-up ratio, i.e. the number of rotations of output shaft 69 for each rotation of output drive shaft 66. The speed step-up mechanism 68 multiplies the controlled variable rotational rate (relatively slow) of the output drive shaft 66 affected by the two hydraulic motors 52 and 56 by a fixed ratio to a relatively high rate (turbine speed) of the output drive shaft 69.

The output drive shaft 69 of the speed step-up mechanism 68 is disposed coaxially with the common turbine shaft 78 and is releasably coupled thereto by an escapement mechanism 116 such as an over-driving slip clutch. The escapement mechanism 116 comprises a coupling carried for rotation with the output drive shaft 69 defining an engagement surface juxtaposed with the adjacent outer surface of the turbocharger shaft 78. When the instantaneous rotational speed of the output drive shaft 69 exceeds the instantaneous rotational speed of the turbocharger shaft 78, the two shafts 69 and 78 are effectively engaged for common rotation. When the instantaneous rotational speed of the output drive shaft 69 is less than the instantaneous rotational speed of the turbocharger shaft 78, the two shafts 69 and 78 are effectively released and are free to rotate at different speeds independently of one another. Thus, the hydraulic assembly 12 serves to "boost" the rotational speed of the turbocharger rotating assembly 70 at the low end of the engine speed range.

The embodiment of FIG. 1 includes:

(a.) A modified power steering pump, which may not include any valve functions or would have typical type construction flow control valve set in the range of 18-22 gpm, would be the fluid source. The pump relief valve, if any, would be set in the range of 1900-2500 psi. Typical power steering flow and relief settings are on the order of 2-4 gpm and 1100-1600 psi respectively. In a typical steering pump, a flow control device limits output with the excess being returned back to the inlet of the pump. Thus, the flow settings, which are many times normal, would not dictate a proportional increase in the pump's displacement but rather a reduction in bypass flow to the pump inlet. Oil would flow through to the motor and manifold hydraulic assembly.

(b.) At the hydraulic assembly the oil first is passed through the upper section of the circuit, which is the supercharger drive. Speed of the drive is controlled proportionally by the restriction of the valve assembly in parallel with the motors. Beyond the restriction of the parallel bypass there is another restriction in line with the second of the two motor assemblies driving the output shaft. Restriction of this second motor control valve determines the torque contribution of the second motor and the displacement ratios between the pump and compressor drive. There is a pressure relief mechanism, not shown in FIG. 1 which limits the maximum pressure at which the motor and hydraulic system can operate. In this manner, the torque to drive the pump can be limited as well to prevent excessive load and wear on the belt and bearings of the accessory drive. As the pressure drops across the first load in the series circuit, the pressure levels in this range would be typical of power steering systems applications.

(c.) Whether the flow has passed through the bypass or either of the two motors it is summed as it enters the lower load of the series circuit, which is the power steering load. The valve mechanism in this lower stage of the hydraulic assembly now sets the flow control and relief settings at levels typical for the steering system requirements as defined in paragraph b. above.

(d.) As pressures drop from the steering supply pressure levels to the return or tank pressures, the excess flow beyond the 2-4 gpm needed by typical steering systems is returned through an additional low-pressure return line.

(e.) Altogether the circuit configuration would require two additional lines over a traditional power steering circuit being the pump to hydraulic assembly line and the return line mentioned in paragraph f.

(f.) The oil cooler may now need to be enlarged as the circuit might be managing considerably more power.

(g.) It should be now noted and appreciated that the series circuit drive and steering system arrangement allows the steering system the same inputs and outputs as in a typical circuit. The pump now sees the combined pressure drop of the two. As the supercharger drive is operating at elevated pressures its shaft seal and bearings must practically be vented to tank pressure through detail not shown on FIG. 1.

It is key to the design that the dual motor arrangement provides for effectively changing the ratios of compressor drive speed to engine speed which makes for much more practical use of centrifugal compressors which are generally less expensive, more reliable and more efficient than fixed displacement designs such as Roots and Lyscolm screw designs typically used in belt driven supercharger applications. This accommodation of the centrifugal compressor is accomplished as follows.

For illustrative example, given a fixed displacement pump of 3 units displacement and primary hydraulic drive motor of 2 units displacement and finally the auxiliary or torque enhancing motor at 1 unit displacement the combinations are as follows. At lower engine speed the flow of 3 units per pump revolution being eventually restricted into only the primary motor would result in a maximum motor drive speed of 3/2 or 1.5× the pump speed. At higher engine speeds the auxiliary motor would be applied in parallel to the primary motor resulting in a motor speed to pump ratio of 3/(2+1) or 1× the pump speed. This is crucial as the ideal boost requirements of the engine would have compressor speed be constant across speed ranges, however as the mass airflow requirements of the engine would be proportional to the speed; the power required by the compressor increases also in proportion to engine speed. Thus, at higher engine speed the compressor has 3 units of motor displacement providing torque, thus approximately equalizing the pressure required on the motors across engine speeds. Essentially this provides the design equivalent of changing pulley ratios on a centrifugal design compressor between crank and compressor pulleys on the fly as engine speed increases.

The dual displacement motor and parallel bypass circuit arrangement in combination with the control strategy also provides an advantage for load acceleration. Until the speed of the output shaft is beyond that which can be supported by the pump flow, both motors can provide torque even if the final steady state speed results in all pump flow turning the smaller motor.

Figure 3:
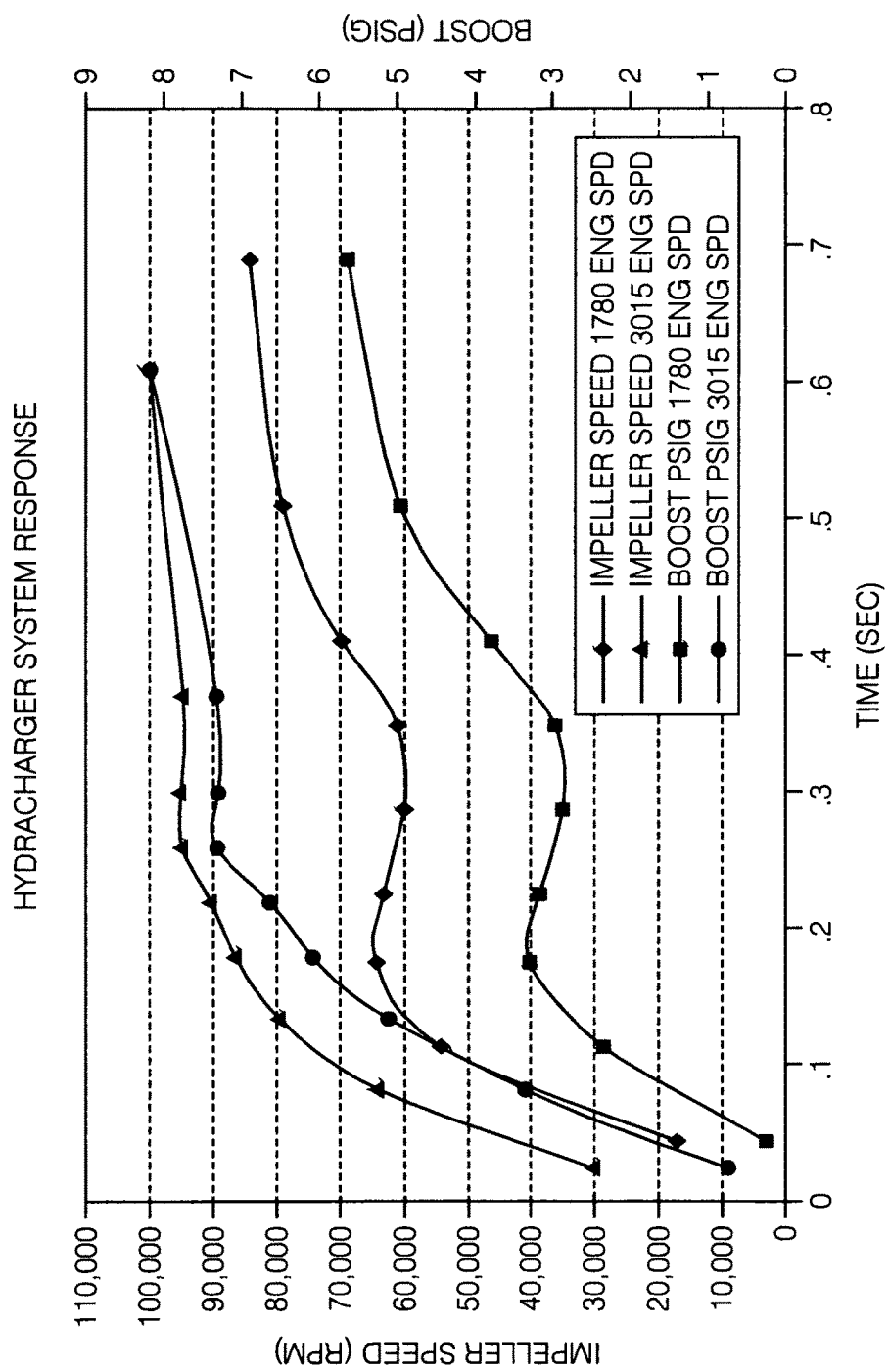
FIG. 3, a graph of test data indicating acceleration characteristics of the invention.

FIG. 3 illustrates the aforementioned characteristics. The graph indicates the compressor drive response at 1780 rpm and 3015 rpm engine speeds. The rise rate at the 3015 rpm condition is very responsive and is indicative of response when pump flow is adequate to employ both motors in steady state condition. The rise rate at the 1780 rpm test condition is initially similar, although slightly lower than the higher flow case, and indicates the torque contribution from both motors. As the speed of the compressor climbs it exceeds the speed which can be supported by flow to both motors in parallel. Acceleration is momentarily delayed as valves shift to direct flow to the primary motor and acceleration slope declines as now torque is only being contributed by one motor. The final speed is some 85% of the 3015 engine rpm case as opposed to the 59% expected strictly from engine speed ratios. Variance from ideal can be attributed to efficiency differences in the hardware between primary and auxiliary motors used at the time of testing.

Although the above describes the response of the system at steady engine speeds, in a vehicle acceleration state with rapidly increasing engine speed the functions described may be less obvious but contributing to performance nonetheless.

Confirming with analysis the acceleration capabilities of the described concept consider a hydraulic motor with a total displacement of 0.60 cubic inch per revolution (CIR), which is the sum of a 0.35 CIR primary motor and a 0.25 CIR auxiliary motor. At a pressure differential of 2000 psi this motor could theoretically produce:

T= (pressure)*(displacement)/(24π)=15.9ft-lbs torque.

Realistically at 85% mechanical efficiency this may yield 13.5 ft-lbs or 18.3 N-m.

Assuming a typical automotive turbocharger rotating group inertia of 3.0E-5 Kg-m^2 and a step up gear ratio of 1:20 yields an effective inertia of Ie=(GR)^2*I=0.012 kg-m^2.

Or an acceleration rate of: Ang-Accel (rad)=Torque/Inertia.

Or Acceleration=18.3/0.012=1525 rad/s^2.

Thus, a speed of 100,000 rpm could be achieved in <0.40 seconds which is just on the bounds or human perception of delay.

From the above considerations it can now be deduced that the ideal hydraulic centrifugal supercharger drive would be comprised of an infinitely variable pump and or motor. For example if a variable displacement motor were coupled to a fixed displacement pump the acceleration advantage, described for the dual displacement drive, could now be a continuously variable mechanism which started with a large motor displacement for maximum torque and reduced motor displacement to increase speed. Further it would be advantageous to be able to increase pump displacement to create more flow at lower engine speeds to increase the hydraulic power available to the motor. When the compressor drive is idle, such as at steady state road conditions, it would be advantageous to have the pump displacement decline in size to reduce parasitic pump loads.

Overall, aside from economic limitations on costs of motors and pumps, the logical practical limitation on such a hydraulic drive would be maximum system pressure allowance and sizing of lines defining a maximum flow. If for example the limitations were 3000 psi pressure and 20 gpm flow. The pump would be sized to provide 20 gpm at the lowest required engine speed and the motor would be large enough in displacement to create the highest useable torque for acceleration. As engine speed increased the pump would decline in displacement to maintain 20 gpm flow. Likewise the motor would be reduced in displacement to provide higher speeds to the compressor until the displacement was matched to the steady state torque requirement of the compressor at the maximum air mass flow and pressure ratio. Such a variable pump and motor system would fully utilize the 20 gpm flow and 3000 psi system capacities to accelerate the compressor and transfer power at the highest possible rate. This fully optimized system would however create controls issues aside from being extremely expensive.

Viewing now FIG. 2, a proposed interface of the hydraulic motors and turbocharger shaft are described. A housing comprising a gearbox cavity would adjoin the motor to the compressor housing. A precision-piloted interface would be employed to align the output shaft and clutch housing to an extension of the turbo shaft on the compressor end. Torque produced by the motors is stepped up in two stages each of approximately 1:4.5. Limitations of packaging and contact ratio of smaller gears make it likely that two stages will be required. Preferably helical gears would be employed to reduce noise. At the entry point of the motor output shaft into the compressor intake enclosure a seal would be employed which would increase seal to shaft pressure upon vacuum in the compressor intake or pressurization of the gearbox cavity. An over-riding slip clutch would couple the output shaft/clutch housing to the compressor shaft extension. The slip clutch would transfer torque from the motor to the compressor shaft but would allow override or slip as the turbine spins the compressor wheel faster than the speed provided by the hydraulic motor. Thus, as the driver depresses the accelerator the control algorithm in the engine controller would restrict the bypass in the hydraulic circuit forcing rapid acceleration of the motor and turbocharger shaft. As the turbine speed exceeds that of the motor output shaft the hydraulics would be deactivated by subsequent command from the engine controller to the hydraulic circuit bypass valve.

As an additional embodiment the turbine section of the compressor may be removed and the system could operate only on hydraulic power. In this manner the expense of the turbine and associated exhaust modifications could be removed. In any case the devices as described herein could eliminate the need for sequential turbocharger apparatus and very likely the need for expensive variable vane and variable geometry turbines.

Figure 4A:
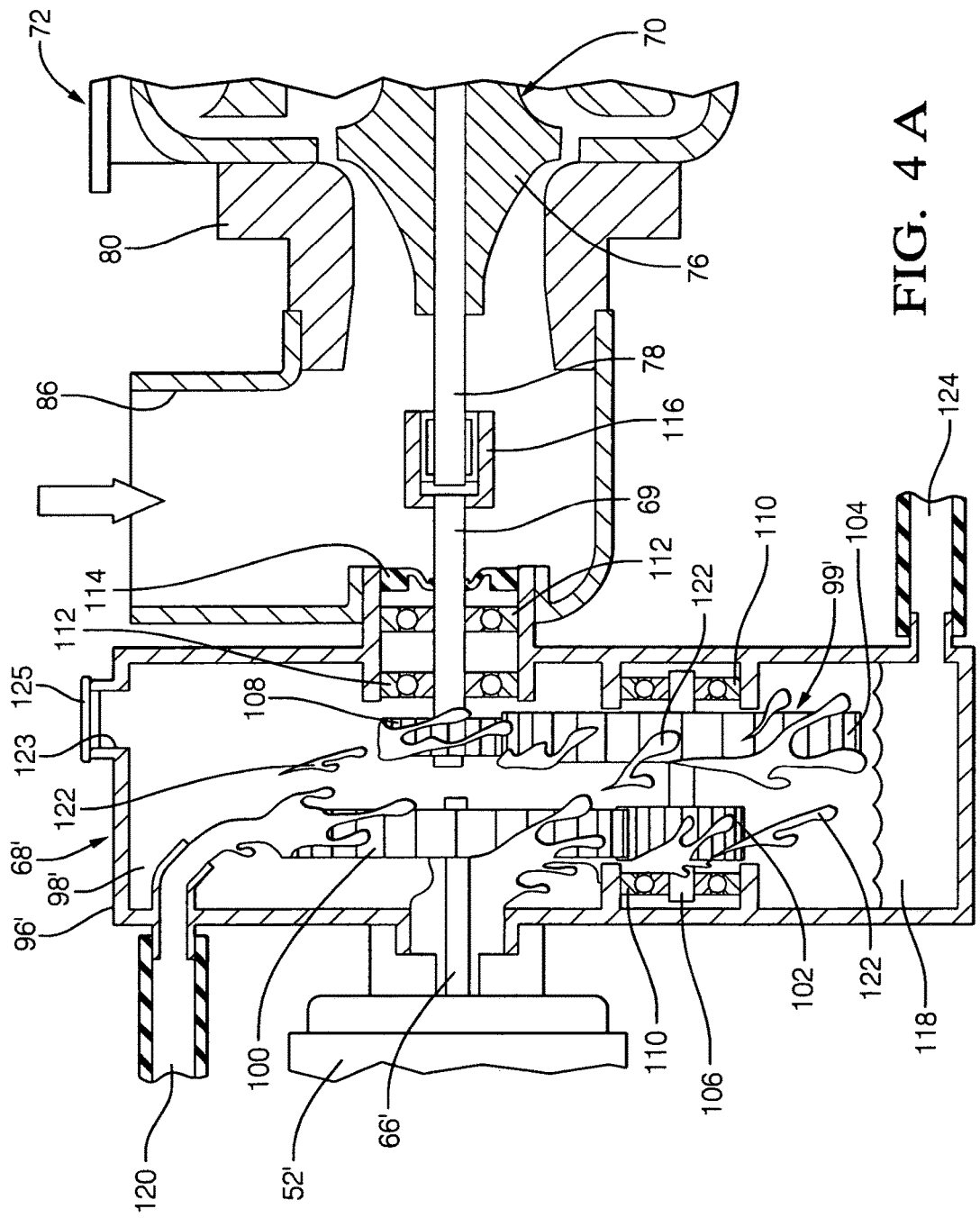
FIG. 4A, is an embodiment utilizing the gear enclosure as a reservoir.
Figure 4:
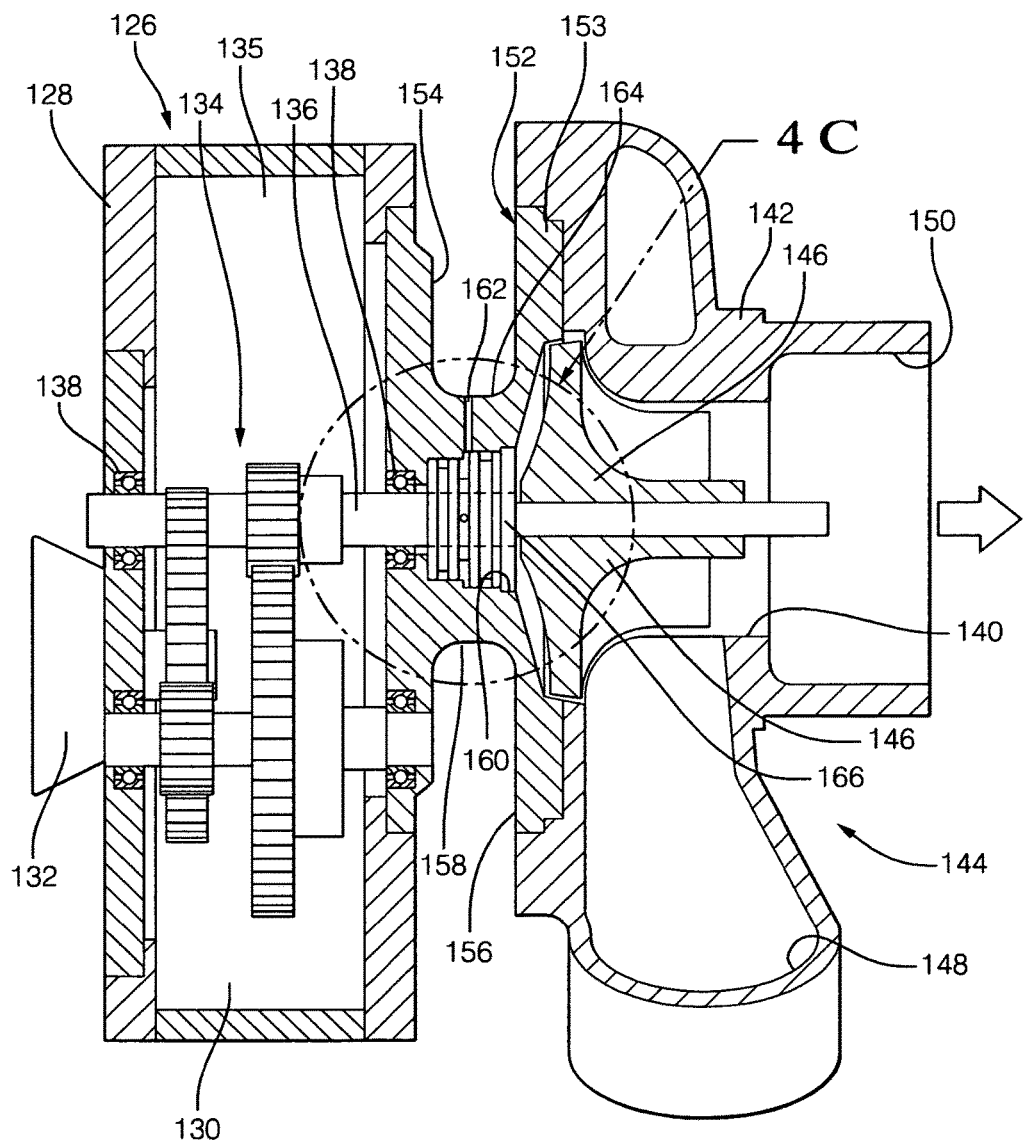
FIG. 4B, illustrates working design tested in vehicle.
Figure 4:
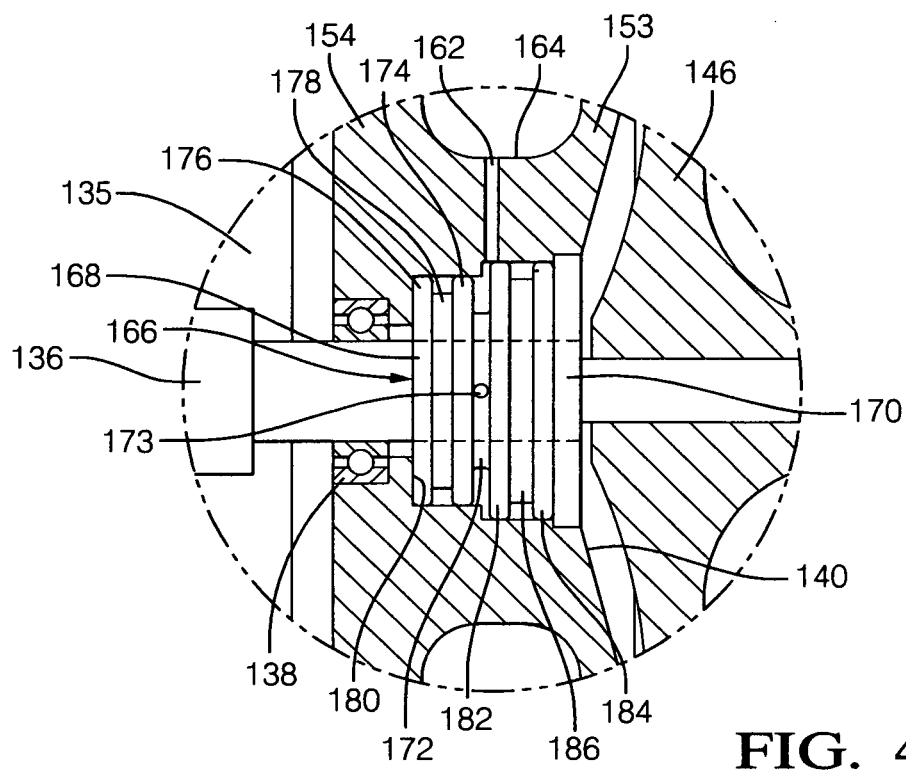

Referring to FIG. 4A, the speed step-up mechanism 68 of FIG. 2 is modified as speed step-up mechanism 68' to increase the overall size of the closed housing 96' to expand the volume of the cavity 98' and thereby provide volume to maintain a reservoir 118 of hydraulic fluid therein beneath the gear set 99'. Returning hydraulic fluid enters the reservoir 118 via an inlet port 120 located above the gear set 99' and from the hydraulic motor 52' about the output drive shaft 66' thereof. As illustrated, hydraulic oil entering the cavity 98' will disperse into droplets 122 fully enveloping the gear set 99' and lubrication/cooling the relatively components thereof. An outlet port 124 enables drawing hydraulic fluid from the reservoir 118 for circulation within hydraulic assembly 12. Make-up hydraulic fluid can be added (or removed from) reservoir 118 via a fill opening 123 sealingly closed by a removable cap 125.

In the enhanced embodiment depicted in FIG. 4A, there is shown a means by which the step up mechanism enclosure or gearbox could be employed to serve as the hydraulic system reservoir. This would facilitate not only elimination of the existing reservoir but allow for flow lubrication of the gear mesh points without windage loss of submerging the gears. It also could allow for the elimination of the hydraulic motor assembly shaft seal by allowing the bearing leakage flow to move directly into the reservoir. Further it can be understood that the return flow from the steering system could be routed through the turbocharger bearing housing if avoidance of typical use of engine oil as bearing lube is desired.

FIG. 4B is an overview of engineering drawings used in the test vehicle where a 2 stage step gear mechanism 126 is housed within an enclosure 128 comprising the system reservoir 130. A hydraulic drive motor 132 provides an input drive to a gear set 134 disposed within a cavity 136 defined by enclosure 128. A stepped output drive shaft 135, supported by high speed roller bearings 138 carried by features of the enclosure 128, and extends outwardly there from into a pumping chamber 140 formed by a housing 142 of a centrifugal compressor 144. A compressor wheel 146 is carried for rotation with the output drive shaft 136 and, in operation, draws air in through an inlet port 148, compresses it, and discharges the compressed air through an outlet port 150.

A seal assembly 152 disposed concentrically with the output drive shaft 136 includes a base member 153 formed by two axially spaced parallel flanges 154 and 156 integrally interconnected by a neck region 158. Flange 154 forms a portion of the enclosure assembly 128 and provides a robust mount for the gear set bearings 138. Flange 156 forms a portion of the centrifugal compressor housing 144 and defines a portion of the pumping chamber 140. A stepped through-bore 160 extends axially through base member 153 providing a passageway interconnecting the cavity 135 of enclosure 128 and the pumping chamber 140 of the compressor housing 142. A vent passage 162 formed approximately midway in the neck region 158 extends radially outwardly from the through-bore 160 to the outer circumferential surface 164 of the neck region 158. This provides an atmospheric vent from the axial mid point of the through-bore 160. A chambered, compound seal 166 is fit within the through-bore 160 concentric with the output drive shaft 136.

As best seen in FIG. 4C, the compound seal 166 includes a first seal portion 168 disposed intermediate the portion of the through-bore 160 opening within hydraulic cavity 135 and the atmospheric vent 162, and a second seal portion 170 disposed intermediate the portion of the through-bore 160 opening within the compressor pumping chamber 140 and the atmospheric vent 162. The seal portions 168 and 170 are axially spaced by a necked region 172 of the compound seal 166 which axially registers with the atmospheric vent 162. A plurality of bearing vent holes 173 (one illustrated) are circumferentially arranged about the necked region 172. The first seal portion 168 is formed by inner and outer flange portions 174 and 176, respectively, axially spaced by a necked region 178. The second seal portion 170 is formed by inner and outer flange portions 182 and 184, respectively, axially spaced by a necked region 186. The compound seal 166 is fixedly positioned within the through-bore 160 by being pressed axially (leftwardly as illustrated) into abutment with at least one rightwardly-facing step 180 of through-bore 160.

Referring to FIG. 4C, detail of the seal 166 isolating the hydraulic system from the engine air intake system will be explained. Given that it is often preferred to have the compressor between the throttle and the engine to improve drivability, the compressor side of the seal will experience both vacuum when at the engine is at idle as well as full boost when the supercharger drive is activated. There is also some pressurization which occurs in the hydraulic reservoir as the oil heats and expands. Given these varying pressure gradients and the generally negative consequences of the hydraulic system and engine air intake system intermingling there is a need for some level of isolating the two systems. There is thus provided a bronze seal which has a very tight diametral clearance on order of 0.015 mm with the high speed compressor shaft as opposed to a larger clearance between the bearing and housing on order of 0.200 mm. At the interface to the bearing/compressor housing there are two polymeric seals to allow for a slight movement of the seal within the housing to better accommodate alignment with the shaft while still maintaining an oil/air tight seal at the periphery. In the middle of the bronze bearing are several vent holes which connect the shaft bore to the cavity between the two seals. A vent hole is provided from this cavity through the housing to atmosphere. By scaling the vent hole to atmosphere much larger than the area created by the diametral clearance of the shaft and bearing a pressure of near atmosphere can be induced at the central portion of the shaft. In this manner the two systems can be prevented from inducing pressure or vacuum upon each other.

Referring to FIG. 5A, a hydraulic pump flow regulation system 187 is illustrated. A hydraulic pump 188 discharged hydraulic fluid into a flow directing chamber or passageway 190 defining an outlet. 192. Returning hydraulic fluid is fed to the pump 188 from two sources, a reservoir return line 194 feeding into an inlet mixing manifold 196 through an open port 198, and a system return flow line 200 feeding hydraulic fluid into a flow regulating chamber 202 feeding the inlet mixing manifold 196 through a flow restricting orifice or boost nozzle 204. Orifice 204 can be sized and shaped as illustrated in FIG. 5B to restrict flow rate and provide a venturi effect.

Referring to FIG. 5C, an alternative hydraulic fluid pump flow regulation system 206 configured from a modified automotive power steering pump is illustrated. A hydraulic pump 208 discharges hydraulic fluid into a flow directing chamber or passageway 210 defining an outlet 212. Returning hydraulic fluid is fed to the pump 208 from two sources, a reservoir return line 214 feeding into an inlet mixing manifold 216 through an open port 218, and a system return flow line 220 feeding hydraulic fluid into a flow regulating chamber 222 feeding the inlet mixing manifold 216 through a flow restricting orifice or boost nozzle 224. Orifice 224 can be sized and shaped to restrict flow rate and provide a venturi effect. Flow regulating chamber 222 extends (leftwardly) beyond the orifice 224 to define a blind end portion 226. Blind end portion 226 contains a regulating piston 228 slidably disposed therein. A compression spring 230 simultaneously bears in one direction against an end wall 232 of the chamber 222 and in an opposite direction against the right-facing end wall 234 of the piston 228. The pressure of the hydraulic fluid within the chamber 222 will actively offset the effect of the compression spring 230. The piston 228 is dimensioned to partially overlay the orifice 224 creating a variable geometry orifice as a function of instantaneous hydraulic fluid pressure in the chamber 222.

Hydraulic flow for the supercharger drive is provided by the hydraulic pump as shown in FIGS. 5A-C. A vane pump is the preferred embodiment due to its inherent low noise, good efficiency, low cost, and relatively small package size. The pump is belt driven off the engine's accessory drive and must operate at speeds of approximately 900 to 9000 RPM. A vane pump of the flow capacity required for this application will typically cavitate at rotational speeds such as these. To avoid this problem it is the preferred embodiment of this invention to direct the flow into the pump as shown in FIG. 5A. Note that oil is directed into the pump from two sources. Flow from the reservoir is typically about 2 GPM. This is the flow from the steering rack that passed through the cooler and reservoir. The remaining flow needed by the pump enters through the system return line. This is the flow that was used by the supercharger motor but did not go through the steering rack. Note that this flow is directed into the pump through a new port added to the pump. This flow passes through a spool that can be axially positioned by rotation of the inlet fitting. This movement adjusts the size (area) of the boost nozzle thereby generating a high velocity jet of oil directed into the inlet of the rotating rotor/vanes. The high velocity jet boosts the inlet pressure of the pump and prevents cavitation at all operating speeds.

FIG. 5B shows a more detailed view of the boost nozzle. It was found through numerous tests that best results were obtained by a "cross" shaped orifice. This design created the highest boost pressure with the least back pressure and allowed the pump to operate at speeds of over 9000 RPM without cavitating.

An alternate means was found to provide the boost to the pump inlet as shown in FIG. 5C. In this embodiment return flow which was not used by the steering system is directed into what would normally be the output port of a pump of typical automotive steering pump construction. The normal passage leading from the rotating pumping mechanism to the spool bore is now blocked and a new pump output port is constructed on the back cover or wherever convenient. The spring and spool which would normally define the flow control in steering pump construction now create a spring loaded mechanism which comprises the boost geometry. This was found to work better than the fixed geometry boost nozzle and required less modification of the automotive steering pump.

Now viewing from the vehicle system perspective, the hydraulic supercharger drive response time can be reduced by providing a signal from the brake or clutch pedal to activate the system in anticipation of throttle actuation. It is an extremely important aspect of a vehicular forced air induction system to provide immediate boost upon throttle command however, given that the hydraulic supercharger drive consumes energy it is advantageous to remain in quiescent mode whenever possible. Accordingly after remaining in quiescent mode during a period of engine idle, the system could gain a highly critical 300-500 ms head start by activating the hydraulic valves upon signal obtained by release of the clutch or brake pedal rather than awaiting a throttle command. System test data shown in FIGS. 6a and 6b illustrate the reduction in time from throttle actuation to 16 psia engine intake pressure, which is 1.5-2.0 psig, depending on barometric pressure. The signal to the system is not shown in FIG. 6B as it changed state before the 28.5 second graph start time and is now off the scale. It also should be noted that in contrast to FIG. 3, where response times to centrifugal compressor speed with equivalent steady state boost pressure were defined, the data in FIGS. 6A and 6B are representative of actual test vehicle data where the volume of the intake system must be pressurized prior to measureable pressure rise.

As can be seen the response is some 195 ms shorter when the system has been activated in advance of the throttle command. This function might well be one of the parameters activated when the driver switches the vehicle from fuel economy to performance mode.

Referring to FIGS. 7, 8A and 8B, some features an embodiment of hydraulic compressor drive 301 will be described. Two hydraulic motors primary motor 302 and auxiliary motor 303 are shown partially comprised by features into the substrate of manifold 304. These motors may be of gerotor or epicycloidal design, although many potential motor constructions are viable. Primary motor inlet port 305 and outlet port 306 as well as auxiliary motor inlet port 307 and outlet port 308 are built into one side of manifold 304 with output shaft bearing pockets 309 and 310 supported within the manifold 304 on one side of the gerotor 311 (FIG. 8A) and the other output shaft bearing 312 supported within end-frame 313 clamping bolts 314 (partially shown in FIG. 8B for clarity) affix gerotor ring 315 and end-frame 313 to the supporting manifold below. Thus the gerotor(s) 311 are housed by a structure comprised of the end-frame 313, the gerotor ring 315 and the manifold 304 below. The motors are designated as primary and auxiliary as the primary is always providing torque when motors are operating and the auxiliary operation is intermittent dependent on conditions. Both motors have 80 tooth gears 316 on primary motor and 317 on auxiliary motor attached to them, the primary being directly coupled and the auxiliary through an interjected unidirectional clutch 318 as best viewed in FIG. 8A. The gears affixed on the output shafts 319 and 320 are driving a common intermediate assembly input gear 321 (shown as 24 tooth also seen in FIG. 8B) which is approximately one third their size in pitch diameter. On the other end of the intermediate shaft 323 is a larger gear 322 (shown as 70 tooth FIG. 8B) on order of the size of the two gears affixed to the motor outputs. It is engaging a fourth rotating member comprising the compressor shaft assembly. On the upper end of the compressor shaft 324 is affixed a gear 325 (shown as 20 tooth FIG. 8B) again about one third the pitch diameter of the two motor gears. On the lower end of the compressor shaft 324 is affixed a centripetal style air compressor 326 as typically found in the compressor section of an automotive turbocharger. As can be noted there are two parallel passages 327 and 328 running beneath the inlet and outlet ports of the two motors within manifold 304. (ref. FIG. 7) Passage 327 is the inlet passage a denoted by directional arrows (FIG. 7) while the other passage 328 collects return oil flow from either motor. A motor bypass passage 329 is shown connecting the inlet and outlet passages which has a controllable restriction comprised of a moveable spool valve 330 which can be controlled means of a lower flow circuit comprised of pilot orifice 333, controls passages 334 and 335 leading in and out of volume containing spring 331 and solenoid controlled restriction 336 as is well known in the art. Solenoid controlled restriction 336 is also called the pressure control valve (PCV) as it controls the pressure in inlet passage 327. It can be seen that the spool valve 330 after moving via force of the spring 331 as depicted in the illustration will first close off the motor bypass passage 329 and then close off the auxiliary motor valve restriction 332. During operation in which pump flow availability is low the spool valve 330 will move to its outward most position via force from the spring 331 fully closing the passage 332 from inlet passage to auxiliary motor inlet. Given that the two motors are connected through the smaller intermediate assembly gear 321, gears on either motor must move in unison. Referring now to FIG. 8A it can be seen that the auxiliary motor may not incur the sheer losses associated with high speed operation as there is provided a unidirectional clutch 318 between the auxiliary motor shaft 320 and auxiliary motor drive gear 317. In this manner the auxiliary motor need only turn when providing drive torque thus increasing overall efficiency by avoiding shear losses.

Figure 8:
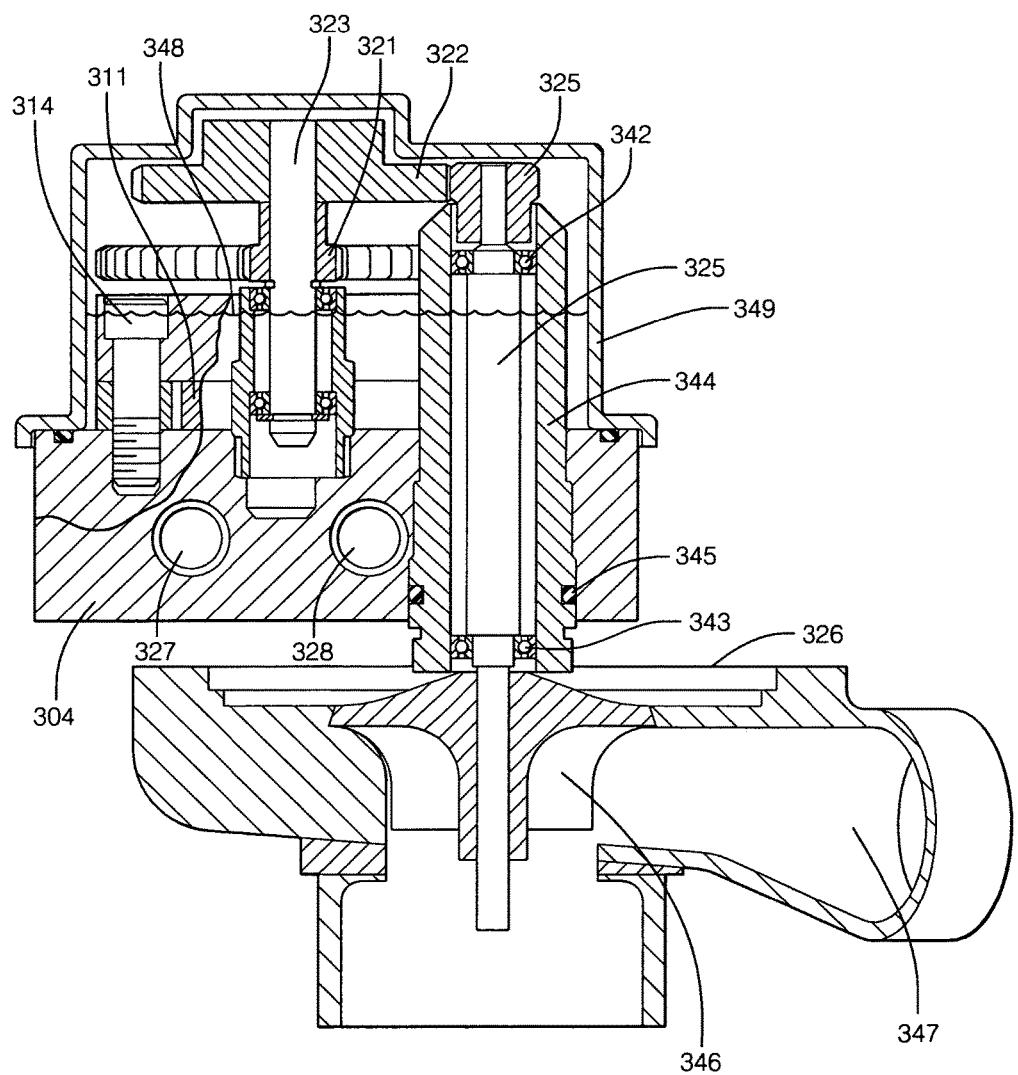

In operation oil is received from the pump (not shown) through inlet port 337 with oil then entering passageway 327. Oil moves from passageway 327 into primary motor inlet port 305 into gerotor 311 turning shaft 319 and gear 316 CCW as shown in FIG. 7. Oil then leaves gerotor 311 through outlet port 306 into return passage 328 and out of unit through outlet 338. Oil also can pass through auxiliary motor input port 307 through passage 332 turning the auxiliary motor 303 and gear 317 CCW before exiting port 308 back into passageway 328. If demand from driver is low solenoid control 336 will be in relaxed position allowing flow to easily pass out of the chamber housing spring 331 through passage 335 and passage 339 to return passage 328. This allows spool 330 to move to the right exposing the opening to passage 329 and allowing oil to bypass the motors. Oil on the order of 0.15 gpm is always being fed from inlet passage 327 through passageway 334 into the spring chamber. The area of control orifice 333 in combination with the frontal area of spool 330 and the spring force on spool 330 at the cracking point of bypass of 329 define the amount of flow. As driver demand increases a greater signal is received through leads 341 from the controller (not shown) to solenoid coil 340. This increases the resistance to flow from passage 335 to passage 339 through PCV 336. The pressure in the spring chamber is increased and the spool 330 moves to the left eventually completely closing off bypass 329 and forcing all oil flow into either of the motors. Gears 316 and 317 are both turning CCW engaging and driving the common 24 tooth gear 321 CW which being fixedly attached to intermediate shaft 323 also drives 70 tooth gear 322 also CW. Gear 322 engages and drives gear 325 on the compressor shaft 324 which is supported by high speed bearings 342 and 343. The bearings are supported in tower 344 which is secured in manifold 304 and sealed by an o-ring in groove 345. The compressor shaft 324 drives impeller 346 CCW as shown in FIG. 8 in compressor housing 326 providing compressed air at outlet 347.

As driver demand increases a larger signal is received at 341 increasing the field on coil 40 further increasing the resistance to the signal flow in PCV 336. The spool valve 330 now moves further to the left restricting and eventually completely closing off passageway 332 restricting and preventing flow into inlet port 307 of the auxiliary motor 303. All pump flow is now forced to move through the primary motor increasing speed to maximum possible for the given pump inflow. Given that the gear 321 engages gears 316 and 317 the auxiliary motor would be forced to turn in this condition otherwise but clutch 318 allows gear 317 to turn freely on shaft 320 avoiding the power losses associated pumping and shear of oil in the auxiliary motor.

There are several subtle key geometries associated with the configuration described. As can be best seen in FIG. 8B the nature of a hydraulic drive dictates that for proper function the reservoir fluid level 348 must be generally above all fluid passages or aeration of the oil will occur. Further given that although the gears comprising the step up mechanism between motors and impeller benefit in efficiency and longevity from contact with oil they will induce unwanted losses and aerate the oil if operating while generally submerged. Thus it is soon determined that the gears must be above the oil level of the reservoir 349 and further the oil level 348 in the reservoir 349 must be as high as can reasonably be packaged within the engine compartment. Finally to minimize gyroscopic induced loads upon vehicle yaw it is advantageous to have the high speed compressor shaft 324 axis oriented vertically in the vehicle. When helical or spur gears are used, the vertical space required is generally lessened if gear axis are oriented vertical. Gearing is shown here as the 80 tooth gears 316 and 317 are attached to both motors driving a common 24 tooth gear 321 rotating on an intermediate shaft 323 arrangement. The 24 tooth gear 321 is affixed to a common shaft 323 to a 70 tooth gear 322 which in turn drives a 20 tooth gear 325 affixed to the compressor shaft 324. Overall this defines an 11.67:1 step up gear ratio.

Another key aspect of the design is the arrangement of compressor shaft 324, impeller 346 and oil fluid level 348. (again referring to FIG. 8B) The compressor shaft 324 is supported by bearings 342 and 343 at either end of a tubular compressor shaft housing 344 which can be sealed at the interface to the manifold 304 by an O-ring in groove 345. In this manner the oil from the hydraulic drive reservoir can be prevented from passing into the compressor section of the device as the top of the compressor bearing support housing can be well above the fluid level 348 in the reservoir 349.

Yet another key factor in the configuration is the side by side arrangement of the motors on the same side of the manifold or base housing. Given that the shape of a centripetal compressor housing 326 is essentially a circular plane some 6-10 inches in diameter on the non-inlet side, a motor assembly constructed to be packaged parallel outside this region would require vary large gears to span the gap from the center of the motor to the compressor shaft. If the motors were to share a common shaft the thickness of the second motor would drive axial length of the whole assembly further sensitizing the oil level gears packaging agenda. Thus optimal packaging is achieved when motors are constructed side by side either with gears affixed to each shaft meshing directly to combine torques or driving a common gear.

In FIG. 8A the means by which shaft seals can be avoided is illustrated as polymeric seals could easily be a durability issue as well as an efficiency loss at motor shaft speeds in excess of 8000 rpm. The construction method used employs the manifold base 304 as bearing support 309 or 310 on one side of the sandwiched motor with an upper bearing support 312 comprised within end-frame 313 which is fully enclosed in the cover & reservoir assembly 349 as the other. The necessary lubrication and cooling flow 351 and 352 for each of the hydra-dynamic bearings on each motor is feed outward (note arrows depicting bearing oil path) naturally from the sandwiched high pressure gerotor 311 motor core. In the case of the bearing opposite the manifold 312 this flow 351 can be discharged directly into out into the cover and reservoir enclosure 353. The bearings built with-in the manifold 309 or 310 are drained by a bored out shaft interior 350 which conveys the bearing oil flow 352 to outside the outer bearing where it too can be discharged into the enclosure.

Referring to FIG. 9 is shown a device 354 which would comprise the circuitry after the aforementioned device if the system required a flow control to support hydraulic assist steering. This portion of the circuit would be generally packaged below the plane on which the motors of device 301 are housed. The device is comprised of housing 356 within which is bore 357, bypass port 358, signal feedback passage 359, trim orifice 360, inlet port 355, steering outlet port 361, venturi chamber 362, steering flow control orifice 363, reservoir inlet 364 and nozzle extension 365. The output volume of the pump flow 338*a*, after passing through the motors or bypass (minus some minimal loss to hydradynamic bearing leakage) is directed to the inlet 355. Initially the biasing spring 366 positions the spool valve 367 upward closing the bypass passage 358 to the venturi chamber 362. As inlet flow 338*a* is raised the pressure drop across the steering flow control orifice 363 climbs until it is equivalent to the force of spring 366 as the spool 367 is forced downward in bore 357. At the point at which bypass 358 is cracked the pressure differential across orifice 363 is the force of compressed spring 366 divided by the frontal surface area of the spool valve 367. This pressure differential across orifice 363 defines a steering flow 368 to be delivered to steering outlet port 361 which will be maintained regardless of amount of inlet flow 338a or backpressure of steering system at port 361 comprising a pressure and inlet flow independent flow control as is well known in the art. Prior to reaching the cracking point as flow 338a increases depressing spool 367 and compressing spring 366 point all flow will be directed to outlet 361 because the bypass 358 remains closed as illustrated by the dotted position shown of spool 367. After cracking of bypass 358 occurs flow begins to move depicted by arrows 369 through the venturi chamber 362. Once into flow control mode as previously described, the pressure drop across the bypass opening to the venturi chamber is equivalent to the sum of the valve cracking pressure plus pressure drop across the steering and or downstream oil cooling portions of the circuit. In the embodiment of this invention this pressure drop is used instead of a classic venturi nozzle to accelerate the fluid as it moves through bypass 358 into venturi chamber 362. This increase in velocity lowers the pressure below atmosphere as described by the Bernoulli equation and oil is thus drawn in from the reservoir through port 364 with a mass flow equivalent loss in momentum. The flow returning 370 is equal to the flow to the steering system 368 plus bearing leakage 351 and 352 from both motors of device 301. It has been found through experimentation that for a system as described with pump flows being in the 3-28 gpm range a bypass opening in the range of 6 to 8 mm diameters is preferable associated with typical steady state steering system pressure loads in the 110-130 psi range. As the high velocity jet from bypass 358 continues through the nozzle extension 365 it passes through a gap in venturi chamber 362 before entering the throat 372 of diffuser 371. Nozzle extension 365 has been shown to improve pressure recovery at point 373 of flow 374 returning to the pump (not shown). Critical to the pressure recovery is spacing of nozzle extension exit 375 to diffuser throat 372 which is preferably 2-5 mm. Also diameter of throat 372 should be on order of 10-20% larger than nozzle extension diameter 375. Pressure recovery is improved by lower ratios of diameter 372 to 375 and smaller axial distance from 72 to 75. A downside is however when bypass flow 369 is low or nonexistent return flow 370 is restricted by axial and diametrical gap of 375 to 372 and pressure at 373 can go several psi below atmosphere causing cavitation noise at the pump particularly with higher oil viscosities at lower ambient temperatures.

As the flow enters the diffuser 371 the velocity declines and pressure builds. Prior art indicates this pressure recovery is best optimized by a 6 degree included angle and at least 4 diameters length. As is well known in construction of power steering pumps this velocity to pressure conversion is employed to provide inlet pressure to the pump inlets to avoid cavitation. In the preferred embodiment of the described art, the pressure recovery at point 373 can be further optimized by employing a diffuser section as described. Further there is described a geometry 376 where the bypass axis is not at the standard 90 degree angle with the spool valve axis but rather at an angle of approximately 69 degrees from the axis of the spool bore as calculated as the theoretical angle of the jetted stream if the clearance between sleeve and bore is minimized Thus by means of the aforementioned, the pressure differential imparted on flow 368 across the steering load is used as the delta pressure to accelerate flow 369 into the venturi thus avoiding the need for an additional power consuming pressure drop later in the circuit associated with a standard venturi nozzle in the circuit for the purpose of pump inlet pressurization.

In FIG. 10 is shown a further embodiment 377 which allows enhanced system performance with the addition of a second control spool 378. In embodiments described up to this point the system could function in two displacement modes. One drive ratio was comprised with just the primary motor displacement providing torque and a second with both the primary motor and auxiliary motor combined producing torque. By addition of this second control spool 378 a third displacement mode can be introduced during which only the auxiliary motor is receiving flow and providing torque. Following on the operational sequence as described on embodiment 301 if after the spool 330 moves to the left far enough to close off bypass 329 and all pump flow is passing through the motors there is now means provided to close off flow to primary inlet port 305 by actuation of a spool 378 which restricts a passage 379 into port 305. This second spool 378 would be controlled by a PCV 382 similar to 336 which would restrict passage of oil out of the chamber containing spring 81 through passages 387 and 383. Referring now again to FIG. 7 not mentioned previously spool valve 330 contained an internally contained relief mechanism which would bypass flow from the chamber containing spring 331 to hole 386 when the pressure in the spring chamber exceeded some maximum allowable system hydraulic pressure say on order of 2200-2500 psi. This volume between the front and back land sections of spool 330 would then receive this relief flow. A hole 385 in manifold 304 would then carry this oil back into the reservoir enclosure 353. In embodiment 377 the second spool can directly contain the passage 384 and control orifice 380 necessary to feed signal flow to the chamber containing spring 381. Spool 330 containing this relief mechanism required a passage way 334 with orifice 333 to be externally housed in manifold 304. Embodiment 377 would therefore also include a second control solenoid 388 and signal input 389 to control the action of the second spool valve 378.

Control of the second spool 378 could be crudely mechanized by a mechanical relief housed internally to spool 378 which triggered well below that of the relief mechanism housed in spool 330. In that manner flow to the primary motor would be opened only when system pressure was above a level defining an inertial startup condition or when overall flows and pressure power levels exceeded spool 378's pressure relief but it would remain closed at lower engine speeds where maximum output speed was desired with the minimal pump flow available.

Referring now to FIG. 11 there is illustrated an analysis of power transfer and output of a system on a 2.0 liter 4 cycle automotive engine in which only a single motor control spool 30 is employed. The pump displacement is 0.689 cubic inches per rev (CIR) the primary motor is 0.35 CIR and the auxiliary motor is 0.23 CIR. The pump to crank pulley ratio is 1.29:1. When the engine is in lower speed ranges 700-3600 rpm all of the available pump flow would be directed to the primary motor with no oil bypassing on valves thus hydraulic drive efficiency would be constant in the range of mid-sixties with both pump and motor exhibiting losses in the 20% range as shown in region 390. Thus 80%×80%=64% In the engine speed range of 3600-6200 rpm the efficiency passes through a valley 391 of decreasing then increasing efficiency as neither the primary motor alone or primary and auxiliary motor in combination can efficiently utilize all the available flow and some losses are incurred by pressure drops in control valves. At approximately 6200 the efficiency again peaks 392 as all available flow can now be utilized by both motors in parallel but falls away continuously again beyond 6200 engine rpm as flow is again excessive unless system pressure limits allow continued compressor speed increases. Accordingly given flow and pressure limitations the boost available to the engine will rise to around 12 psi at 3600 rpm shown at 393, bottom out at approximately 5100 rpm at 9 psi shown at 394 and rise again to a peak of 13 psi at 6200 rpm shown at 395. Crank power draw climbs as a square function to the 3600 rpm point 396 then as system reaches pressure limit rises linearly with speed in region 397.

FIG. 12 illustrates the same system on the same vehicle except now a third high efficiency point is added through the addition of the second motor control spool 378. The pump to crank pulley ratio has been dropped to 1.05:1 as opposed to 1.29:1 in the previous diagram. This allows a larger pulley on the pump reducing both belt loads and pump speed. Initially the second control spool is in the closed position forcing all available pump flow to the auxiliary motor which is the smaller displacement of the two allowing highest motor to pump speed ratio. In this mode hydraulic drive efficiency is again near 64% up to 2600 engine rpm shown at point 398. As the valving shifts the available flow from auxiliary motor to primary motor the efficiency drops in valley 99 and then rises to peak again at 4200 engine speed at point 400. It then declines again through valley 401 and rises while valving shifts flow from just the primary motor to both primary and auxiliary motors in parallel. Efficiency then peaks again just above 7000 rpm at point 402. As can be seen this three optimal efficiency points 398, 400 and 402 in this configuration can extend the useful range both lower and higher in engine rpm while lowering belt stress and pump maximum speeds.

Another embodiment allows the three drive ratio speeds to be achieved without the addition of a second solenoid control valve. FIGS. 13A - D illustrate such an embodiment. A spool 403 with two large sets of lands 404 and 405 has a hollowed core 406 allowing substantial communication from the front or right side of the spool as shown to the region between the lands 407. A biasing spring in compression pushing the spool to the right (not shown) and a solenoid valve (not shown) controllably draining the volume between the housing and left end of the spool would act in concert along with appropriate passage ways and orifices to comprise a pilot control circuit to control the position of the valve. This would then allow an electronic signal to control left/right position of the spool regulating a given pressure level at the front of the spool as is well known in the art. In this embodiment it is critical that the outlet ports be arranged with the bypass 408 on the left most position the outlet to the smaller displacement of the two motors 409 or loads in the middle and the outlet port to the larger displacement 410 of the two motors or loads be on the rightmost position of the three ports. Generally at a given inlet flow from the source or pump movement of the spool to the right would result in increasing system pressure as the load at that given flow would be forced to move or turn ever faster. Viewing now FIG. 13A the topmost of the four depictions in the illustration shows the system with the spool in the furthest left or bypass position. In this position the pressure would be the lowest and the spring would be in its most compressed position. Flow from the pump would be free to move to all three ports bypass 408, smaller motor 409 and larger motor 410. Bypass flow would be channeled through the core 406 of the spool 403.

In the second from the top depiction FIG. 13B the spool 403 has moved to the right now closing off access to the bypass port 408. Thus all available flow is channeled to both motors in parallel. This comprises drive ratio #1. It should be noted the valve is designed in an underlap or make before break manner such that a continuous movement to the right will cause the output speed and pressure to transition from drive ratio to drive ratio. In this transition mode the speed is still totally controllable but a portion of the flow is bypassed into the lower speed of the two ports reducing system efficiency but still maintaining infinite speed control.

In the third from the top depiction FIG. 13C the spool 403 has advanced further to the right producing a yet higher system pressure applied to the loads. The outlet port 409 to the smaller of the two motors is blocked creating the second drive ratio condition. Again the transition from drive ratio one to drive ratio two is continuous and infinite control is maintained.

In the lowest of the four depictions FIG. 13D the spool 403 is in its furthest to the right position the system pressure at the defined inlet flow is at its highest. Now the outlet port to the larger of the two motors 410 or loads is blocked and all flow is routed to the smaller displacement motor or load causing the highest achievable system pressure and/or compressor speed for the defined flow. This flow to the smaller motor is now however routed again through the core of the spool as shown.

In this manner a hydraulic drive mechanism with two fixed displacement motors can be controlled by a single solenoid control input allowing continuous and infinite speed adjust through and between three specific drive ratio combinations of pump and motor.

Efficiency boundaries of hydraulic motors and required impeller tip speeds for centrifugal compression would dictate a speed increasing device of greater than 10:1 between the output of the hydraulic drive and the compressor impeller. Practical limits on gear size, tooth size and contact ratios tend to force a two stage mechanism. Experimentation of two stage ratios each approximately 3.5:1 for a total of 12.25:1 appear to be workable both from a functional strength and packaging perspective.

Another alternate method for the required step up mechanism may be a high lead angle reversed worm drive with the gear as the input and the worm as the output. With lead angles approaching 45 degrees and multiple worm starts a quiet speed increaser of minimal package size, acceptable efficiency and ratio of 10-20 is workable. This may be particularly workable in a gear enclosure with forced lubrication.

FIG. 14 depicts a control strategy interface to the vehicle. Unlike superchargers and turbochargers which traditionally have a pneumatically operated bypass or waste-gate which closes when throttle demand is low and or are operated by manifold pressure, the herein described device requires an electronic signal to modulate the hydraulic control valve(s). Upon throttle depression in a normally aspirated vehicle of nearly any reasonably sized displacement engine there is noticed an initial if however brief satisfying linear relationship of torque response to throttle position. Unfortunately in an underpowered vehicle this sensation of increasing torque to throttle position ends very shortly into throttle excursion. The intent of the algorithm is to extend that satisfying feeling by allowing a continuously increasing torque sensation as the throttle is depressed up through diminishing levels of manifold vacuum to atmospheric pressure and blending as seamlessly as possible into positive manifold pressure (boost). The first step in algorithm development was to establish the line of near zero manifold vacuum or near atmospheric pressure point as a function of throttle position and engine speed. It was determined that in general this near zero manifold pressure line starts at approximately 15% throttle position at 1000 rpm and increases to approximately 70% when the engine is in the 6500-7000 rpm range. As can be seen in figure #8 there is a considerable region at the lower left in which the hydraulic drive would not be actuated at all as this represents mild everyday driving behavior as is dictated by CAFÉ cycles. The equation as shown in FIG. 14:

Duty Cycle(%)=(DC2−DC1)/(100−TPX)×(TP−100)+ DC2 (where TP=Percentage full throttle)

which thus provides a means by which signal to the hydraulic drive control valves is linearly increased starting at or near zero manifold pressure point and ending proportionately in each engine speed range at full output to hydraulic control valve when throttle position is at maximum.

In yet further another embodiment the two aforementioned motors can be arranged with additional modification of valving to produce four separate drive ratios. As mentioned before the flow can be directed to either or both motors as well as a percent flowing to bypass allowing variable speed control on three ratios. FIG. 15 illustrates that if both motors are receiving flow 412 from a pump 411 coupled to the same shaft 413 and the smaller motor 414 is plumbed in reverse direction becoming a pump a fourth drive ratio can be obtained. In this configuration the larger motor 415 creates the greater torque driving the smaller motor 414 backwards causing it to pump fluid Q3 from the reservoir back up to the supply line 416 where it combines with flow from the pump Q1 ultimately driving the larger motor 415 and attached rotary load 417 at a speed caused by Q2 which is the sum of Q1 and Q3 defined as a system with the effective drive ratio of:

Drive Speed =Pump Flow (Q1)/(Displacement Larger Motor -Displacement Smaller Motor).

FIG. 15 illustrates flows in valve position 5, wherein Q1 +Q3 =Q2 with a smaller motor coupled to the larger motor on a common shaft is driven (backwards) becoming a pump.

FIG. 16 shows a general hydraulic schematic of such a circuit to provide 4 speed ratios from 2 fixed displacement motors. Valve position #1 allows both motors 415 and 414 and a bypass circuit to return flow to the reservoir 418 allowing for very slow rotation. As the valve advances to position #2 the bypass is closed and all flow is directed to the two motors in parallel comprising drive ratio #1. In valve position #3 the flow path to the smaller motor is blocked causing all flow to be directed to the larger motor comprising drive ratio #2. It should be noted that in order to allow the smaller motor to freewheel easily while being driven by the larger a check-ball 419 is installed in the valve at position #3 located between inlet and outlet of the smaller to allow an isolated circuit for the back pumping of the smaller motor to occur. As the valve proceeds to position #4 all flow is directed to the smaller displacement motor thus comprising drive speed ratio #3. As an alternate to check-ball 419 a one way roller clutch 420 is installed coupling the larger displacement motor to the shaft allowing it to slip on the shaft when back driven thus eliminating the pumping losses and the shear losses of the motor turning needlessly. In valve position #5 the flow path from the pump to the larger displacement motor is re-established and the inlets and outlets on the smaller motor are reversed. As previously described this creates drive ratio #4.

FIG. 17 illustrates an analysis of such a 4 drive ratio system indicating how it can be utilized to allow a mechanism with just two fixed displacement motors to yield performance approaching that of a much more complex and costly infinitely variable pump or motor system. In such a system there would be four engine speed points (1200 rpm, 2400 rpm, 3900 rpm and 7000 rpm) where all of the pump's flow could be effectively utilized while maintaining the speed of the compressor impeller near constant while the engine speed changes 14× from 500 to 7000 rpm. As the pressure ratio or boost created by a centrifugal compressor rises as the speed squared it is desirable to drive it at a near constant speed as engine speed changes. The compressor power (torque rise) however required to maintain this speed generally rises in proportion to engine speed as air mass flow increases. The slight positive slope on the target compressor speed line is to compensate for flow restriction in the compressor housing which constitutes a drop in compressor outlet pressure thus to maintain constant compressor outlet pressure, speed must increase slightly with engine speed. In between each of these ideal points either the system speed and pressure would be higher or flow would be bypassed around the motors or sent through them at a speed lower than required to generate torque.

FIG. 18 illustrates another packaging embodiment of the two stage step up gearing arrangement. In this case instead of the 70 tooth gear 322 being packaged above the 24 tooth gear 321 out of the oil it is packaged well below on the bottom side of the manifold 304 where it engages a much shorter compressor shaft 324 again coupled to the 20 tooth gear 325 driving the compressor shaft 324 and the impeller 346. In this arrangement it is not the compressor shaft that is housed to allow isolation of the reservoir fluid from the compressor but rather the intermediate shaft 323. The intermediate shaft 323 is housed in a vertical housing 419 that protrudes through and above the reservoir oil level with oil seals 420 arranged to prevent draining into the compressor housing 326. Now referring to the 10× view it can be seen that two copper or bronze isolator washers 421 and 422 are aligned with close tolerance on the intermediate shaft 323 with a spring 423 compressed between to maintain the washers contact against the intermediate shaft housing 419 on the top and the manifold 304 on the bottom. With this spring arrangement the washers can align freely on the shaft. These two washers with close slip fit on the shaft and assured contact above and below create an isolated enclosure 424 that can be vented through passage 425 as shown to the atmosphere. As long as the cross sectional area through the venting passage 425 and spring coils 423 is significantly larger than the clearance between the shaft 323 and ID of the washers 421 and 422 a near atmosphere pressure will be maintained in the volume 424 around the spring. This effectively isolates the pressure variances in the reservoir enclosure 453 (upper chamber) from the pressure variances in the compressor interface (lower chamber) such that oil is not drawn from the hydraulic drive into the engine when the throttle suddenly closes and vacuum is encountered under the impeller 346 and boost pressure does not leak-out reducing supercharger performance or potentially rupturing the hydraulic reservoir 349. Alternate arrangements could be provided to allow pressurization of the hydraulic reservoir to a preset but limited level to assist in pump inlet boost. Air from the venting chamber 424 is often laden with oil mist which must be accommodated. It could be collected temporarily in the reservoir cap chamber and sucked back into the reservoir 349 after vehicle shutdown when the cooling oil creates a slight vacuum on the reservoir. Or potentially the oil misted air could be channeled to a near atmosphere inlet position at the engine air intake where the mist would be consumed into the engine creating a minor oil consumption rate.

FIG. 19 illustrates an embodiment of the circuit without integration to a hydraulic steering system. In this case there is no flow control valve 354 (from FIG. 10) pressure drop available to create fluid velocity to power a venturi. There is also not a controlled low level flow to steering (i.e. <4 gpm) which is convenient for oil cooling and filtration. Instead an alternate approach is employed. When the fluid leaves the outlets of the two hydraulic motors through primary motor outlet port 306 and auxiliary motor outlet port 308 it is channeled (see main return flow) to a long converging and later diverging passage 426. This geometry creates a high velocity low pressure region 427 as defined by Bernoulli's equations called the venturi throat in which a low level flow in this case bearing lubrication and cooling flows 351 and 352 from both motors can be returned through passage 428 from the reservoir. In this configuration there is no steering flow being routed back through the reservoir so the return flow is comprised of just hydrodynamic bearing flow defined by leakage 351 and 352 from both the motor stacks along with an occasional discharge from relief mechanism pilot flows. A controlled flow is provided to oil cooler 430 by plumbing a parallel path 429 and 433 to the venturi tube 426. The pressure drop propelling flow in the side circuit containing the oil cooler from inlet 431 to outlet 432 from the venturi tube is powered by laminar losses and inefficiency of pressure recovery in the venturi tube 426. This is ideal as this pressure drop is only large during high pump flow periods such that at typical low throttle driving conditions the oil cooler flow will be diminished and oil temps will remain elevated reducing parasitic losses. This essentially teed in arrangement of the reservoir still provides for means to fill and add oil, create accommodation for thermal expansion and contraction of the fluid and assuring the circuit low point is referenced to atmosphere.

FIG. 20 shows preferred dimensional characteristics of the venturi tube arrangement of FIG. 19. The specific configuration shown has produced very favorable results and essentially has outperformed traditional venturi arrangements in the efficiency of pressure recovery.

FIG. 21 indicates this performance. Looking at the far right of the graph along the horizontal axis at approximately the 28 gpm pump flow point the following data is found.

| | |
|---|---|
| Venturi inlet pressure | 100 psig -point 434 |
| End of diffuser pressure | 82 psia -point 435 |
| Pump inlet pressure | 62 psia -point 436 |
| Dp venturi inlet to outlet | 32 psi -point 437 |
| Oil cooler flow | 2.3 gpm -point 438 |

The pressure excursion from the front of the venturi to the end of the diffuser was 100 psig to 82 psia. Atmospheric pressure at the time of testing was 14.4 psia thus venturi pressure recovery was 82 psia/(100 psig+14.4 psia)=71.7%. This is exceedingly high as venturi performance is typically in a maximum range of 35-40%. As can be seen there was a 20 psi drop from the end of the diffuser to the inlets of the pump vanes but still nearly 50 psi pump boost assuring excellent power delivery to the circuit and quiet pump operation.

FIG 22 illustrates an arrangement of a hydraulic drive 464 used in series configuration with a conventional turbocharger. After passing through the inlet filter 439 air would first be compressed by the hydraulically driven compressor 426 driven by hydraulic drive unit 464 and cooled by the auxiliary intercooler 440. The hydraulically driven compressor would be sized such that gearing and drive would allow PR from 3-4 at lower engine speeds where mass flows on a 2.0 engine 441 are in the range of 0.07 kg/s to 0.15 kg/s. The engine 441 would feed turbine 442 of turbocharger assembly 443 through exhaust manifold 444. Air leaving auxiliary intercooler 440 would be the intake air for the compressor 445 powered by turbine 442. Turbine 442 would be optimized for extreme high end flow such that waste gate 446 would seldom be used or could potentially be eliminated. Exhaust would leave the system to after-treatment at 460. This very large turbine 442 would present a minimal restriction to engine exhaust thus pressure at exhaust manifold 444 could be very low at lower typical steady state exhaust flows. After leaving compressor 445 air would be cooled by the main intercooler 447 and routed through throttle 448 and into the engine intake 449. Compressor 445 would be sized as to be moving through the highest efficiency island at a PR of 3-4 and a flow in the range of 0.24- 0.40 kg/s. The rotational inertia of the rotating group of turbocharger 443 will be very large and spool up will take an extended period of time maybe 1-3 seconds. Hydraulic drive 464 has ability to accelerate compressor 426 extremely rapidly providing torque fill during this spool up period. In the region of 2500 to 4500 engine rpm and flow ranges of 0.15 to 0.24 kg/s compressors 426 and 445 would comprise a two stage compressor system providing a higher PR in the heart of the engine range where torque response is so fundamental to vehicle performance. FIG. 23 shows the restriction to air flow of a unpowered smaller compressor as potentially used for item 426. It is shown to be approximately 25 in-H2O at 0.09 kg/s mass flow. It could be 15-20 psi restriction at 0.40 kg/s thus bypass/check-valve arrangement 459 is necessary.

Further to power the hydraulic drive 464 there is a pump 450 driven by engine shaft 451 through pulley 452 belt 453 and pulley 454. An electromechanical clutch 455 is defined to allow the pump to be decoupled during steady state conditions to eliminate parasitic loss of the pump for fuel economy. ECU 456 would be in communication with said clutch and solenoid valve(s) on hydraulic drive 464. The ECU 456 would also be in communication with vehicle brake position sensor 461 and vehicle clutch position sensor 462 and throttle position sensor 463. Control strategies in ECU 456 would allow clutch 455 to disengage the pump whenever immediate boost would not be demanded of the system such when either vehicle brake or vehicle clutch were depressed indicating vehicle. Clutch 455 as well as signals to hydraulic drive solenoids could be activated as soon as the brake was released to ready the systems for throttle actuation some 200-500 ms later. Further when engine speed was very high and main turbo 443 was creating high boost clutch 455 would be deactivated. Other algorithms might be developed which would allow the system to avoid the parasitic loads of the pump 450 without jeopardizing system response. Overall the system described in FIG. 22 could be an extremely responsive and powerful forced air induction system with moderate costs and very low efficiency loss over the equivalent normally aspirated engine.

Then forgoing defines an electro mechanical clutch powered by brake and clutch pedal inputs.

FIG. 24 shows a more recent embodiment of the device 521 arranged in a fashion to allow more application flexibility and extremely low tooling investment. A manifold 465 very similar to 304 in FIG. 7 has affixed to it a cereal bowl shaped lower gearbox enclosure 466 which in turn has an upper gearbox (lid) 467 fitting within it and enclosing a volume comprising a gearbox housing and reservoir 470. Located on a circular pilot 468 which is a portion of upper gearbox 467 is mounted the centrifugal compressor housing 469. Located on the opposite side of and bolted to manifold 465 are two hydraulic motor assemblies 472 and 473. Extending below and in fluid communication with the manifold 465 are inlet passage tube 474 and motor outlets passage 475. Attached and in fluid communication with 475 and 474 is venturi housing block 476 which is essentially the same as device 354 described by FIG. 9. Attached to venturi housing 476 is diffuser 477. Exiting from diffuser 477 is return flow to pump 478.

Mounted on compressor shaft 479 is centrifugal compressor impeller 480. Compressor shaft 479 is supported in rotational motion by high speed bearings 481 and 482. Bearings 481 and 482 are housed in lower cartridge housing 483. Lower cartridge housing 483 is positioned by pocket 484 in manifold 465.

Looking now to FIG. 25 there is shown a top or plane view of manifold 465 from FIG. 24. Inlet flow 485 from the pump (not shown) enters manifold passage 487 from inlet port 486. Passage 487 is intersected by passage 488 which also comprises a bore for moveable spool 489. By moving fore and aft in bore 488 moveable spool 489 controls fluid flow from inlet 486 and passage 487 to both motor 472 through metering opening 491 inlet port 493 to motor 472 and by further moving aft to bypass to passage 490. Oil forced to move through motor 472 turning it CW exits port 492 to enter passage 490.

Further down passage 487 inlet flow 485 encounters spool 495 controllably moving left and right in bore 500 which restricts flow through opening 494 allowing flow into inlet port 496 of motor 473. Oil which passes through motor 473 turning it CW exits through outlet port 497 into passage 498. Passage 498 leads downward and out of manifold 465 through opening 499 moving into conduit 475 (shown in FIG. 24). Steering and cooling return flow leave reservoir and gearbox enclosure 470 through manifold 465 at downward opening 501 enter into inlet passage tube 474. Steering and cooling return flow reenter reservoir and gear enclosure 470 through opening 503. Opening 504 is provision for an oil fill and dipstick tube (not shown). Ports 505 and 506 house solenoid PCV's such as 336 described in FIG. 7. They control moveable spools 495 and 489 respectively as described earlier. Bore/depression 502 receives and positions lower cartridge housing 483.

FIG. 26 describes features of the compressor housing and impeller support Impeller 480 is mounted on compressor shaft 479 which are rotationally supported by high speed bearings 481 and 482 as mentioned previously. Also mounted on compressor shaft 479 is gear 507. Gear 507 is driven by gear 508 on intermediate shaft 509 which is in turn driven by common drive gear 510 which is in turn driven by two gears 510 and 511 (only one of two shown) which are in turn driven by motors 473 and 472 through shafts and over-riding slip clutches (not shown) as previously mentioned.

Lower cartridge housing 483 and upper cartridge housing 512 are bolted together by bolts (not shown) containing and positioning and allowing rotation in bearings 481 and 482 of high speed rotating group 514 comprised of shaft 479, impeller 480 and gear 507. This assembly can now be balanced as a subassembly 516 as an integral unit through belt drive feature 515 on shaft 479. Upon final unit assembly subassembly 516 is located in the upper gear housing 467 and bolted in place by bolts 513. This allows critical balance of the high speed rotating group 514 which is not further disturbed in the process.

Compressor housing 469 has affixed to it mounting ring 517. Mount ring 517 fits into a annular groove 519 cut into the top of upper gear housing 467. This construction allows compressor housing 469 to rotate as a turret without further impact on the assembly. Multiple set screws 518 mount in threaded holes in upper gear housing 467. Angular feature 520 on mounting ring 517 allows downward locking and positioning of the mount ring 517 and in turn compressor housing 469 onto the general assembly 521 easily according to customer needs.

The following documents are deemed to provide a fuller disclosure of the inventions described herein and the manner of making and using same. Accordingly, each of the below-listed documents are hereby incorporated in the specification hereof by reference:

U.S. Pat. No. 5,535,845 to J. Buschur entitled "Automotive Hydraulic System and Method".

U.S. Pat. No. 5,561,978 to J. Buschur entitled "Hydraulic Motor System".

U.S. Pat. No. 5,669,461 to J. Buschur entitled "Automotive Hydraulic System and Method".

U.S. Pat. No. 5,687,568 to J. Buschur entitled "Hydraulic Motor System".

U.S. Pat. No. 5,778,693 to M. Mientus entitled "Automotive Hydraulic Engine Cooling System with Thermostatic Control by Hydraulic Actuation".

U.S. Pat. No. 5,881,630 to J. Buschur et al. entitled "Apparatus and Method of Controlling Fluid Flow between a Plurality of Vehicle Components".

U.S. Pat. No. 5,946,911 to J. Buschur et al. entitled "Fluid Control System for Powering Vehicle Accessories".

U.S. Pat. No. 5,960,628 to K. Machesney et al. entitled "Hydraulically Powered Fan and Power Steering in Vehicle".

U.S. Pat. No. 5,960,748 to J. G. Lewis entitled "Vehicle Hydraulic Component Support and Cooling System".

U.S. Pat. No. 6,016,657 to J. Buschur entitled "Automotive Hydraulic System and Method".

U.S. Pat. No. 6,021,641 to J. Buschur et al. entitled "Hydraulically Powered Fan System for Vehicles".

U.S. Pat. No. 6,158,216 to J. Buschur et al. entitled "Hydraulically Powered Fan System for Vehicles".

U.S. Pat. No. 6,308,665 B1 to J. G. Lewis entitled "Vehicle Hydraulic Component Support and Cooling System".

U.S. Pat. No. 6,612,822 B2 to J. Buschur et al. entitled "Hydraulic Motor System".

U.S. Pat. No. 6,629,411 B2 to J. Buschur et al. entitled "Dual Displacement Motor Control".

U.S. Pat. No. 7,608,011 B2 to Grabowski et al. entitled "Hydrogen Fueled Hybrid Powertrain and Vehicle".

U.S. Pat. No. 7,490,594 B2 to Van Dyne et al. entitled "Super-Turbocharger".

U.S. Pat. No. 7,481,056 B2 to Blaylock et al. entitled "Turbocharger with Adjustable Throat".

U.S. Pat. No. 7,111,704 B2 to Johnson entitled "Hydrostatic Drive Apparatus for a Road Vehicle".

U.S. Pat. No. 6,502,398 B2 to Kapich entitled "Exhaust Power Recovery System".

U.S. Pat. No. 6,412,278 B1 to Matthews entitled "Hydraulically Powered Exhaust Gas Recirculation System".

U.S. Pat. No. 5,724,949 to C. Liang entitled "Hydraulic Drive for a Pressure Wave Supercharger Utilized with an Internal Combustion Engine".

U.S. Pat. No. 5,346,364 to D. Kapich entitled "Very High Speed Hydraulic Turbine Drive". And U.S. Pat. No. 4,729,225 to J. Bucher entitled "Turbo-Charged Internal Combustion Engine with Exhaust Gas Energy Recuperation".

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for illustrative purposes and convenience and are not in any way limiting, the invention, which is defined by the following claims as interpreted according to the principles of patent law, including the Doctrine of Equivalents, may be practiced otherwise than is specifically described.

The invention claimed is:

1. An automotive forced air induction system operative to boost inlet air pressure of an internal combustion engine comprising:

a turbocharger including an exhaust driven turbine and a centrifugal air compressor driven by said exhaust driven turbine;

hydraulically driven air compressor having an inlet and an outlet; and a bypass for induction air arranged in parallel with said hydraulically driven air compressor and operative to open when air pressure at the outlet of the hydraulically driven compressor is less than at the inlet of the hydraulically driven compressor.

2. The system of claim 1 further comprising:

an intercooler disposed downstream of said hydraulically driven compressor, wherein said bypass for induction air is configured to enable air movement parallel to the series combination of said hydraulically driven air compressor and said intercooler.

3. The system of claim 1, wherein said bypass comprises a check ball assembly.

4. The system of claim 1, wherein said bypass comprises a flapper check assembly.

5. The system of claim 1, further comprising:

a hydraulic pump operative to drive said hydraulically driven air compressor in mechanical coupling to the engine; and a controllable clutch operative to selectively disengage coupling of said pump from said engine.

6. The system of claim 5, further comprising:

a control mechanism operating said controllable clutch dependent on a pressure drop measured across said bypass.

* * * * *